US012745691B2

(12) United States Patent
Moellers et al.

(10) Patent No.: US 12,745,691 B2

(45) Date of Patent: Sep. 29, 2026

(54) METHODS AND APPARATUS TO DETERMINE AGRICULTURAL START POINTS

(71) Applicant: Deere & Company, Moline, IL (US)

(72) Inventors: Jacob Moellers, Urbandale, IA (US); Alisha N. Schwertner, Miles, TX (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 19/067,460

(22) Filed: Feb. 28, 2025

(65) Prior Publication Data

US 2026/0256042 A1 Sep. 3, 2026

(51) Int. Cl.

*A01B 79/00* (2006.01)
*G01C 21/00* (2006.01)
*G07C 5/04* (2006.01)

(52) U.S. Cl.

CPC .............. *A01B 79/005* (2013.01); *G07C 5/04* (2013.01)

(58) Field of Classification Search

None

See application file for complete search history.

(56) References Cited

U.S. PATENT DOCUMENTS 5,668,719 A * 9/1997 Bobrov ............... A01M 7/0092 702/2
8,437,901 B2 5/2013 Anderson
8,594,897 B2 * 11/2013 Motavalli ............ A01C 21/005 701/50
9,288,938 B2 * 3/2016 Cavender-Bares .. A01B 69/008
9,420,737 B2 * 8/2016 Spiller ................. A01B 69/008
9,519,861 B1 * 12/2016 Gates ...................... G06N 20/00
10,012,998 B2 * 7/2018 Nimchuk ............... G06Q 50/40
11,089,773 B2 * 8/2021 Frieberg ............... A01C 15/003
11,112,262 B2 9/2021 Anderson
12,342,756 B2 * 7/2025 Vandike ............... G05D 1/6985

(Continued)

FOREIGN PATENT DOCUMENTS

JP 2019004816 A 1/2019
WO WO 2017169373 A1 10/2017

OTHER PUBLICATIONS

Extended Search Report and Written Opinion issued in European Patent Application No. 26152675.0 dated Jun. 17, 2026, in 5 pages.

*Primary Examiner* — Jonathan M Dager

(74) *Attorney, Agent, or Firm* — Hanley, Flight & Zimmerman, LLC

(57) ABSTRACT

Systems, apparatus, articles of manufacture, and methods are disclosed An example apparatus includes interface circuitry, machine readable instructions, and programmable circuitry to at least one of instantiate or execute the machine readable instructions to: collect historical vehicle usage data that includes: descriptions of agricultural activities performed on a field, start points of the agricultural activities, and timestamps associated with the agricultural activities, cluster two or more of the start points together, wherein the two or more start points are selected based on one or more of the historical vehicle usage data, historical weather data, historical field data, or historical policy data, generate a new start point based on the cluster, the generated start point being located within the field, and transmit the generated start point to a vehicle that is associated with the field.

20 Claims, 14 Drawing Sheets

VEHICLE USAGE DATA 300

| | 304 | 306 | 308 | 310 | 312 | 314 | 316 | 318 |
|---|---|---|---|---|---|---|---|---|
| | DATE | TIME | OPERATOR | ACTIVITY | START LATITUDE | START LONGITUDE | END LATITUDE | END LONGITUDE |
| 302A | 2009-09-09 | 14:59 | EMPLOYEE A | TILLING | 43°08'21.4"N | 84°28'57.2"W | 43°07'96.5"N | 84°28'96.4"W |
| 302B | 2008-12-01 | 8:28 | OWNER | TILLING | 43°08'01.7"N | 84°28'41.6"W | 43°07'89.5"N | 84°28'40.7"W |
| 302C | 2013-03-22 | 9:17 | EMPLOYEE A | TILLING | 43°08'15.6"N | 84°28'24.0"W | 43°08'08.1"N | 84°28'19.0"W |
| 302D | 2013-04-25 | 15:05 | EMPLOYEE C | TILLING | 43°08'00.8"N | 84°28'28.5"W | 43°07'64.5"N | 84°28'18.3"W |
| 302E | 2013-02-25 | 11:18 | OWNER | TILLING | 43°08'07.3"N | 84°28'34.4"W | 43°08'01.7"N | 84°28'48.4"W |
| 302F | 2009-05-31 | 8:47 | EMPLOYEE B | TILLING | 43°08'13.0"N | 84°28'44.5"W | 43°07'56.7"N | 84°28'11.3"W |
| 302G | 2007-06-30 | 12:13 | OWNER | TILLING | 43°07'86.2"N | 84°28'04.5"W | 43°07'67.7"N | 84°28'63.6"W |
| 302H | 2008-09-19 | 15:07 | LEASEE | PLANTING | 43°07'58.0"N | 84°28'73.7"W | 43°07'77.5"N | 84°28'03.3"W |
| 302I | 2011-03-08 | 15:53 | EMPLOYEE C | PLANTING | 43°08'03.4"N | 84°28'62.4"W | 43°07'82.8"N | 84°28'64.4"W |
| 302J | 2010-11-16 | 12:28 | OWNER | PLANTING | 43°07'57.9"N | 84°28'10.6"W | 43°07'67.8"N | 84°28'96.6"W |
| 302K | 2009-05-06 | 9:04 | EMPLOYEE C | FERTILIZING | 43°07'87.9"N | 84°28'66.8"W | 43°07'71.0"N | 84°28'31.2"W |
| 302L | 2005-01-10 | 15:45 | EMPLOYEE B | FERTILIZING | 43°07'75.3"N | 84°28'64.4"W | 43°07'91.5"N | 84°28'29.9"W |
| 302M | 2003-11-16 | 10:05 | LEASEE | HARVESTING | 43°07'63.8"N | 84°28'25.6"W | 43°07'64.1"N | 84°28'46.9"W |
| 302N | 2011-07-31 | 12:30 | OWNER | HARVESTING | 43°07'66.6"N | 84°28'98.1"W | 43°07'70.5"N | 84°28'60.2"W |
| 302O | 2010-02-16 | 11:37 | LEASEE | HARVESTING | 43°07'63.5"N | 84°28'51.0"W | 43°07'75.3"N | 84°28'24.6"W |

...

(56) References Cited

U.S. PATENT DOCUMENTS 12,457,929 B2 * 11/2025 Vandike ............... A01D 41/127
12,536,480 B2 * 1/2026 Hoffmann .......... G06Q 10/0631
12,582,035 B2 * 3/2026 Clark ................... A01D 41/127
12,620,096 B2 * 5/2026 Patzoldt ............... A01C 21/005
2006/0178820 A1 * 8/2006 Eglington ............ A01B 69/008 701/50
2012/0127032 A1 * 5/2012 McClure ................. G01S 19/13 342/357.44
2016/0146611 A1 * 5/2016 Matthews ............ A01B 69/001 701/533
2017/0102702 A1 * 4/2017 Ishijima ............... G05D 1/0219
2017/0318732 A1 * 11/2017 Yamashita ............... G05D 1/02
2018/0374009 A1 * 12/2018 Hunsaker ................ H04W 4/44
2019/0050948 A1 * 2/2019 Perry ..................... G06Q 50/02
2019/0227561 A1 * 7/2019 Hiramatsu ........... A01B 69/008
2020/0134485 A1 * 4/2020 Sood ........................ G06N 5/01
2020/0375084 A1 * 12/2020 Sakaguchi .......... B60W 40/064
2021/0144911 A1 * 5/2021 Plattner ................ A01C 21/005
2022/0366336 A1 * 11/2022 Khasis ..................... G08G 1/04
2023/0165192 A1 * 6/2023 Nishii ................ A01D 41/1278
2023/0206430 A1 * 6/2023 Patzoldt ............... A01C 21/005 348/148
2023/0251386 A1 * 8/2023 Stoffregen .............. G01S 19/43 342/357.44
2023/0306795 A1 * 9/2023 Lechner ................. G07C 5/008
2023/0350423 A1 * 11/2023 Mähler ................ A01B 69/008
2023/0380327 A1 * 11/2023 Kuboshima .......... A01B 69/008
2023/0385958 A1 * 11/2023 Ghanta .............. G06Q 10/0637
2024/0049636 A1 * 2/2024 Vandike ............. A01D 41/1278
2024/0138291 A1 * 5/2024 Reusch ................ A01C 21/007
2024/0184435 A1 * 6/2024 Malladi .................... G07C 5/06
2024/0220780 A1 * 7/2024 Connell ................... G06N 3/08
2025/0117021 A1 * 4/2025 Komaru ............... A01B 69/008
2025/0117719 A1 * 4/2025 Zhou ...................... G06N 20/00
2025/0189995 A1 * 6/2025 Strief ..................... A01C 7/006
2025/0261575 A1 * 8/2025 Colosky ............... A01B 69/008
2025/0301953 A1 * 10/2025 Singh ................. A01D 41/1275
2025/0359500 A1 * 11/2025 Verploegen .......... A01B 69/008
2025/0386761 A1 * 12/2025 Bech .................... A01C 21/005
2026/0013449 A1 * 1/2026 Sheline ................ A01G 25/165
2026/0076292 A1 * 3/2026 Portz .................... A01C 21/007
2026/0083043 A1 * 3/2026 Robillard ............. A01B 69/008
2026/0099643 A1 * 4/2026 Zemenchik ............. G06F 30/20
2026/0125055 A1 * 5/2026 Krishnakumar ..... A01B 69/008

* cited by examiner

VEHICLE USAGE DATA 300

304 306 308 310 312 314 316 318

| | DATE | TIME | OPERATOR | ACTIVITY | START LATITUDE | START LONGITUDE | END LATITUDE | END LONGITUDE |
|---|---|---|---|---|---|---|---|---|
| 302A | 2009-09-09 | 14:59 | EMPLOYEE A | TILLING | 43°08'21.4"N | 84°28'57.2"W | 43°07'96.5"N | 84°28'96.4"W |
| 302B | 2008-12-01 | 8:28 | OWNER | TILLING | 43°08'01.7"N | 84°28'41.6"W | 43°07'89.5"N | 84°28'40.7"W |
| 302C | 2013-03-22 | 9:17 | EMPLOYEE A | TILLING | 43°08'15.6"N | 84°28'24.0"W | 43°08'08.1"N | 84°28'19.0"W |
| 302D | 2013-04-25 | 15:05 | EMPLOYEE C | TILLING | 43°08'00.8"N | 84°28'28.5"W | 43°07'64.5"N | 84°28'18.3"W |
| 302E | 2013-02-25 | 11:18 | OWNER | TILLING | 43°08'07.3"N | 84°28'34.4"W | 43°08'01.7"N | 84°28'48.4"W |
| 302F | 2009-05-31 | 8:47 | EMPLOYEE B | TILLING | 43°08'13.0"N | 84°28'44.5"W | 43°07'56.7"N | 84°28'11.3"W |
| 302G | 2007-06-30 | 12:13 | OWNER | TILLING | 43°07'85.2"N | 84°28'04.5"W | 43°07'67.7"N | 84°28'63.6"W |
| 302H | 2008-09-19 | 15:07 | LEASEE | PLANTING | 43°07'58.0"N | 84°28'73.7"W | 43°07'77.5"N | 84°28'03.3"W |
| 302I | 2011-03-08 | 15:53 | EMPLOYEE C | PLANTING | 43°08'03.4"N | 84°28'62.4"W | 43°07'82.8"N | 84°28'64.4"W |
| 302J | 2010-11-16 | 12:28 | OWNER | PLANTING | 43°07'57.9"N | 84°28'10.6"W | 43°07'67.8"N | 84°28'96.6"W |
| 302K | 2009-05-06 | 9:04 | EMPLOYEE C | FERTILIZING | 43°07'87.9"N | 84°28'66.8"W | 43°07'71.0"N | 84°28'31.2"W |
| 302L | 2005-01-10 | 15:45 | EMPLOYEE B | FERTILIZING | 43°07'75.3"N | 84°28'64.4"W | 43°07'91.5"N | 84°28'29.9"W |
| 302M | 2003-11-16 | 10:05 | LEASEE | HARVESTING | 43°07'63.8"N | 84°28'25.6"W | 43°07'64.1"N | 84°28'46.9"W |
| 302N | 2011-07-31 | 12:30 | OWNER | HARVESTING | 43°07'66.6"N | 84°28'98.1"W | 43°07'70.5"N | 84°28'60.2"W |
| 302O | 2010-02-16 | 11:37 | LEASEE | HARVESTING | 43°07'63.5"N | 84°28'51.0"W | 43°07'75.3"N | 84°28'24.8"W |

...

FIG. 3

METHODS AND APPARATUS TO DETERMINE AGRICULTURAL START POINTS

FIELD OF THE DISCLOSURE

This disclosure relates generally to agricultural vehicles and, more particularly, to methods and apparatus to determine agricultural start points.

BACKGROUND

Agricultural vehicle usage has become increasingly complex. A given agricultural vehicle may include multiple actuators and sensors to support a variety of different agricultural operations (plowing, planting, lifting, harvesting, fertilizing, etc.). Furthermore, many agricultural organizations use different combinations of personnel and agricultural equipment to perform different types of operations on different fields. Thus, over an extended period, any number of users may perform any number of agricultural operations on a given field using any number of agricultural vehicles.

SUMMARY

Example methods, apparatus, systems, and articles of manufacture to determine agricultural start points are described herein. Further examples and combinations thereof include the following.

Example 1 includes an apparatus to generate a start point, the apparatus comprising interface circuitry, machine readable instructions, and programmable circuitry to at least one of instantiate or execute the machine readable instructions to collect historical vehicle usage data that includes descriptions of agricultural activities performed on a field, start points of the agricultural activities, and timestamps associated with the agricultural activities, cluster two or more of the start points together, wherein the two or more start points are selected based on one or more of the historical vehicle usage data, historical weather data, historical field data, or historical policy data, generate a new start point based on the cluster, the generated start point being located within the field, and transmit the generated start point to a vehicle that is associated with the field.

Example 2 includes the apparatus of example 1, wherein the historical weather data includes a) one or more of temperature, precipitation, wind, or humidity data, and b) corresponding timestamps.

Example 3 includes the apparatus of example 1, wherein the historical field data includes a) one or more of soil health indicators, crop type, or growth stage data, and b) corresponding timestamps.

Example 4 includes the apparatus of example 1, wherein the historical policy data includes a) one or more of organizational data, user preference data, external boundaries, or internal boundaries, and b) corresponding timestamps.

Example 5 includes the apparatus of example 1, wherein the programmable circuitry is to generate the new start point by averaging coordinates of the two or more start points within the cluster.

Example 6 includes the apparatus of example 1, wherein the cluster is a first cluster, and the programmable circuitry is to form a second cluster that includes two or more start points that are different than the first cluster, wherein the two or more start points in the second cluster are also selected based on the one or more of the historical vehicle usage data, historical weather data, historical field data, or historical policy data used to form the first cluster, select the first cluster based on a determination that the first cluster has more data points than the second cluster, and generate the new start point based on the first cluster.

Example 7 includes the apparatus of example 1, wherein in response to receiving the generated start point, the vehicle is to autonomously travel to the generated start point, and begin performance of an agricultural activity upon arrival at the generated start point.

Example 8 includes the apparatus of example 1, wherein a user edits the generated start point before the vehicle begins to perform an agricultural activity on the field.

Example 9 includes the apparatus of example 8, wherein the programmable circuitry is to adjust one or more techniques used to generate the start point based on a distance between the original generated start point and the edited start point.

Example 10 includes the apparatus of example 9, wherein the programmable circuitry is to train a machine learning model, generate the new start point by executing the machine learning model, and retrain the machine learning model based on a distance between the original generated start point and the edited start point.

Example 11 includes the apparatus of example 1, wherein before the transmission of the generated start point to the vehicle, the programmable circuitry is to check whether the start point is valid by determining whether a) the generated start point is within external boundaries of the field and b) the generated start point is outside internal boundaries of the field.

Example 12 includes the apparatus of example 1, wherein the vehicle is associated with the field if the vehicle has previously performed one or more of the agricultural activities on the field, the vehicle is scheduled to perform agricultural activities on the field in the future, or the vehicle is predicted to perform agricultural activities on the field in the future.

Example 13 includes a non-transitory machine readable storage medium comprising instructions to cause programmable circuitry to at least collect historical vehicle usage data that includes descriptions of agricultural activities performed on a field, start points of the agricultural activities, and timestamps associated with the agricultural activities, cluster two or more of the start points together, wherein the two or more start points are selected based on one or more of the historical vehicle usage data, historical weather data, historical field data, or historical policy data, generate a new start point based on the cluster, the generated start point being located within the field, and transmit the generated start point to a vehicle that is associated with the field.

Example 14 includes the non-transitory machine readable storage medium of example 13, wherein the programmable circuitry is to generate the new start point by averaging coordinates of the two or more start points within the cluster.

Example 15 includes the non-transitory machine readable storage medium of example 13, wherein the programmable circuitry is to regenerate the start point in response to a determination that the vehicle has entered the field at a first location to perform an agricultural activity, left the field before completing the agricultural activity, and reentered the field to complete the agricultural activity at a second location that is different than the first location, wherein the programmable circuitry determines the regenerated start point based in part on the second location.

Example 16 includes the non-transitory machine readable storage medium of example 13, wherein the cluster is a first cluster, and the programmable circuitry is to form a second cluster that includes two or more start points that are different than the first cluster, wherein the two or more start points in the second cluster are also selected based on the one or more of the historical vehicle usage data, historical weather data, historical field data, or historical policy data used to form the first cluster, select the first cluster based on a determination that the first cluster has more data points than the second cluster, and generate the new start point based on the first cluster.

Example 17 includes the non-transitory machine readable storage medium of example 13, wherein a user explicitly edits the generated start point using a user interface before the vehicle begins to perform an agricultural activity on the field.

Example 18 includes the non-transitory machine readable storage medium of example 13, wherein a user implicitly edits the generated start point by starting an agricultural activity with the vehicle at a location that is different than the generated start point.

Example 19 includes a method comprising collecting historical vehicle usage data that includes descriptions of agricultural activities performed on a field, start points of the agricultural activities, and timestamps associated with the agricultural activities, clustering two or more of the start points together, wherein the two or more start points are selected based on one or more of the historical vehicle usage data, historical weather data, historical field data, or historical policy data, generating a new start point based on the cluster, the generated start point being located within the field, and transmitting the generated start point to a vehicle that is associated with the field.

Example 20 includes the method of example 19, wherein generating the new start point further includes averaging coordinates of the two or more start points within the cluster.

BRIEF DESCRIPTION OF THE DRAWINGS

FIG. 3 is an illustrative example of the vehicle usage data of FIG. 2.

In general, the same reference numbers will be used throughout the drawing(s) and accompanying written description to refer to the same or like parts. The figures are not necessarily to scale.

DETAILED DESCRIPTION

Figure 1:
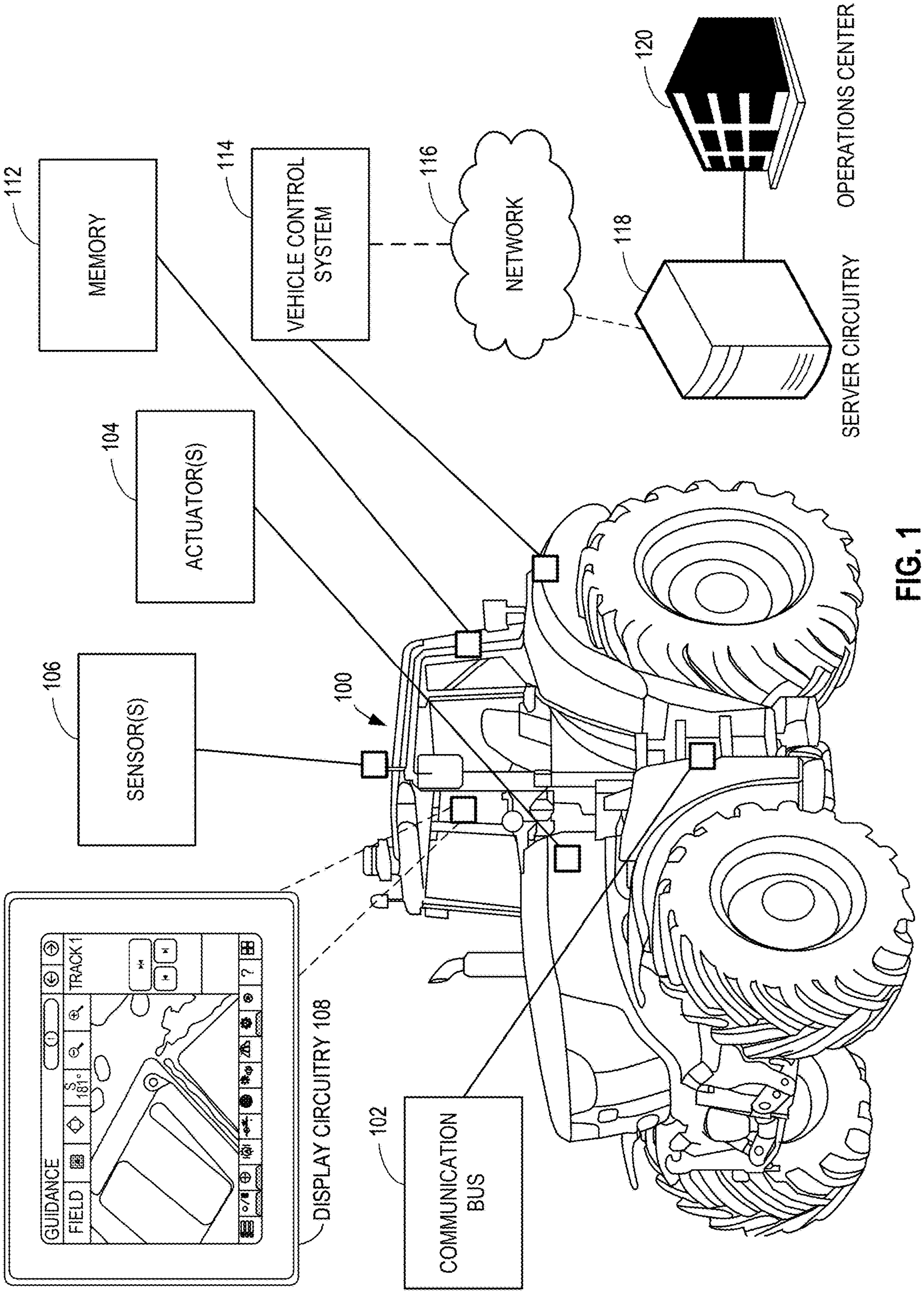
FIG. 1 is a block diagram of an example environment in which an example agricultural vehicle operates according to a start point.

Starting locations play a major role in determining the efficiency of agricultural operations performed in a field. For example, throughout a season, farmers generally aim to perform agricultural operations (e.g., planting, spraying, harvesting, etc.) evenly across the area within a given field. However, if a farmer drives an agricultural vehicle through the field in a manner that causes the vehicle to pass over a portion of the field more than once during a single agricultural operation, a disproportionate amount of the operations may be performed on the foregoing portion of the field relative to the other areas of the field. For example, a tractor that drives through a portion of a field twice during a single operation may inadvertently apply twice as much fertilizer to said portion as other areas of the field, or may try to re-harvest the portion of the field despite crops having already been removed from there, etc. Thus, the starting location of the agricultural vehicle affects whether the farmer can perform the agricultural operation once and only once on each portion of the field.

As used above and herein, a starting location refers to the geographical coordinates where an agricultural vehicle begins to perform an operation. In some examples, the terms "starting location" and "start point" are used interchangeably. In some examples, a tractor that drives through a portion of a field twice during a single operation is referred to as a vehicle path that crosses over itself.

The starting location of any operations performed in a given field are influenced in part by the dimensions of the field. For example, starting locations are generally on or near the perimeter of a field, rather than the middle of the field, to reduce the likelihood of the vehicle path crossing over itself. While the dimensions of a given field are static, starting locations within said field can vary widely. For example, starting locations may change based on the type of operations performed because different agricultural operations require different types of vehicles (and/or different end effectors) and therefore require different paths through the field. Starting locations can also change on the weather (e.g., on dry days a first entrance to a field is preferable, but on rainy days a second entrance is used because the first entrance tends to flood), crop type (e.g., a first crop grows best in rows that point north/south while a second crop grows best in rows that point east/west), user preference data (e.g., a first employee lives to the north of the field and thus prefers to enter and exit the field from the north, while a second employee lives to the south of the field and thus prefers to enter and exit the field from the south), and more. Data that influences a decision to pick a starting location is described further in connection with FIG. 4.

Traditionally, farming organizations had a comparatively small number of people that worked on a comparatively small amount of land (e.g., a family owns a few hundred acres of land, farms the land themselves, and manages the corresponding business themselves). In such examples, the number of fields managed by the farming organization is sufficiently small and all starting locations can be manually determined by one or more farmers. Furthermore, the small size of traditional farming organization means that members do not need a formalized communication system to exchange starting location information. Rather, members can exchange starting location information by simply talking, texting, emailing, or using any other suitable communication technique on an ad-hoc basis.

Recently, the size and complexity of farming organizations have increased such that a given organization has a comparatively large number of people working on a comparatively large amount of land (e.g., a company with hundreds or thousands of employees many farm on thousands or millions of acres of land). Thus, the number of starting locations that correspond to a single farming organization may be too large for a single person or group of employees to manually compute. Instead, each employee tasked with performing an agricultural operation on a field may determine their own starting point, leading to inconsistencies in how operations are performed on the field and exposing the organization to inefficiencies. Furthermore, the large number of employees, agricultural vehicles, and fields corresponding to modem farming organizations limit the ability for starting location information to be effectively distributed throughout the organization.

Example methods, systems, and apparatus described herein automatically select a starting location for agricultural vehicles to perform operations on fields. Example server circuitry collects historical starting locations from one or more agricultural vehicles that have previously performed agricultural operations on a given zone. The server circuitry groups the starting locations into one or more clusters based on factors including but not limited to vehicle usage data, weather data, field data, and policy data. The server circuitry then generates a new start point by averaging the geographical coordinates of the cluster with the most data points. The server circuitry may further adjust the generated start point for factors such as biodiversity, weather, track lines, headlands, etc. In some examples, a field is divided into multiple zones where each zone has a generated started point. In such examples, path finder circuitry determines a path by through the field by determining a traversal order of the zones that efficiently links the start points and end points of each zone.

FIG. 1 is an illustrative example of a vehicle 100. The example of FIG. 1 shows that the vehicle 100 includes a communication bus 102, actuators 104, sensors 106, user interface circuitry 202, memory 112, and a control system 114. While the example of FIG. 1 points to various locations of the vehicle 100 for illustrative purposes, the communication bus 102, the actuators 104, the sensors 106, the memory 112, and the control system 114 may be implemented at any location(s) within and/or throughout the vehicle 100. The example of FIG. 1 also includes a network 116, server circuitry 118, and an operations center 120.

The vehicle 100 refers to any type of vehicle that has a user interface (UI). In the example of FIG. 1, the vehicle 100 is a tractor. In other examples, the vehicle 100 is a different type of vehicle including but not limited to a combine, a mower, a fertilizer, a sprayer, a truck, etc. While the examples below refer to the vehicle 100, the teachings described herein are applicable to any type of machine that moves across land to perform agricultural operations (e.g., drones, agricultural vehicles, etc.).

The communication bus 102 refers to one or more physical connections that enable communication between the other components of the vehicle 100. The communication bus 102 may be implemented using one or more protocols that meet pre-determined threshold power and latency requirements. Such communication protocols include but are not limited to: Controller Area Network (CAN), Ethernet, etc.

The actuators 104 refer to one or more components of vehicle 100 that convert a first type of energy into mechanical energy. The first type of energy may be implemented by any suitable input to a given actuator, including but not limited to electrical energy, pneumatic energy, hydraulic energy, etc. The actuators 104 may use the mechanical energy in a variety of forms, including but not limited to the application of a force or a torque, a movement or displacement of a component, etc. In the example of FIG. 1, one or more of the actuators 104 are implemented within, and are not detachable from, the vehicle 100. Such actuators include but are not limited to an engine, a transmission, an axle, a crop header, an auger, a front-end loader, a backhoe, etc. In some examples, one or more of the actuators 104 are external devices that can attach and detach to the vehicle 100 depending on the use case. Such actuators include but are not limited to balers, sprayers, tillers, cultivators, threshers, etc. The vehicle 100 may implement and/or attach to any number of actuators 104.

The sensors 106 refer to one or more devices that measure and/or obtain vehicle data corresponding to the vehicle 100. In the example of FIG. 1, the sensors 106 include a position sensor (e.g., a global positioning sensor (GPS)) to detect a geographic position of the vehicle 100. Additionally or alternatively, the sensors 106 can include an inertial sensor (e.g., an accelerometer, a gyroscope, etc.) to measure acceleration, velocity, and/or orientation (e.g., yaw, pitch, and/or roll) of the vehicle 100. In some examples, the vehicle 100 includes other sensors including but not limited to a temperature sensor, Global Navigation Satellite Systems (GNSS) sensors, Light Detection and Ranging (LIDAR) sensors, Radio Detection and Ranging (RADAR) sensors, sound Navigation Ranging (SONAR) sensors, telematics sensors, etc.

The user interface circuitry 202 presents a UI on a display. The UI generally contains information regarding the actuators 104, the sensors 106, and/or communication between the vehicle 100 and an external device. As seen in FIG. 1, the UI also includes one or more screens that show a map of a zone overlaid with a pin icon to show the generated start point. As used above and herein, a zone refers to any amount of land on which agricultural operations may be performed. In some examples, the display circuitry 108 shows a map with multiple zones and multiple corresponding start points. The display circuitry 108 may additionally or alternatively show a map with one starting location that connects to a path for the vehicle 100 to drive through. The display circuitry 108 is described further in connection with FIGS. 2 and 6.

The memory 112 stores data used by one or more components of the vehicle 100 to perform operations. For example, the memory 112 may store sensor measurements, actuator configuration data, data that relates to the presentation of information on the user interface circuitry 202, etc. The memory 112 may be implemented as any type of memory. For example, the memory 112 may be a volatile memory or a non-volatile memory. The volatile memory may be implemented by Synchronous Dynamic Random Access Memory (SDRAM), Dynamic Random Access Memory (DRAM), and/or any other type of RAM device. The non-volatile memory may be implemented by flash memory and/or any other desired type of memory device. The memory 112 is described further in connection with FIG. 2.

The control system 114 manages the operations of the other components within the vehicle 100. In the example of FIG. 1, the control system 114 transmits signals via the communication bus 102 that cause one or more of the actuators 104 to move, cause one or more of the sensors 106 to perform a measurement, present information on the user interface circuitry 202, and/or provide data to an external device such as the server circuitry 118. The control system 114 may also receive signals via the communication bus 102 that contain operator inputs from controls within the cabin, measurement data from the sensors 106, status data from the actuators 104, etc. In some examples, data that the control system 114 receives from one or more of the actuators 104, the sensors 106, and/or the display circuitry 108 is referred to as vehicle usage data.

The control system 114 may be implemented by any type of programmable circuitry. Examples of programmable circuitry include but are not limited to programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). The control system 114 is described further in connection with FIG. 2.

The network 116 connects and facilitates communication between the control system 114 and devices external to the vehicle 100. Such devices include but are not limited to the server circuitry 118. In this example, the network 116 is the Internet. However, the example network 116 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The server circuitry 118 generates start points for land managed by a farming organization. The server circuitry 118 generates one start point per zone as described in the teachings herein. In some examples, the server circuitry 118 also determines how to divide the land managed by the farming organization into multiple zones. The server circuitry 118 assigns one or more zones to a given field. In some examples, the server circuitry 118 generates a path through a field based on the start points of the two or more zones within the field. The server circuitry 118 may determine how many zones to form, where to form each zone, when to generate a path, etc. based on any criteria, including but not limited to instructions from the farming organization.

The server circuitry 118 may be implemented with any type of programmable circuitry. In some examples, the server circuitry 118 is implemented with hardware components (programmable circuitry, power supplies, cooling systems, etc.) suitable to train and update machine learning models.

The server circuitry 118 transmits start points for land operated on by the vehicle 100 to the control system 114. The control system 114 then instructs the display circuitry 108 to overlay the start points on maps as described above. The server circuitry 118 also transmits other start points to other vehicles managed by the farming organization. Accordingly, a farming organization can use the server circuitry 118 to the distribute the start point information in a scalable and organized manner that is not possible in previous approaches. For example, the server circuitry 118 may send multiple copies of the same generated start point to multiple vehicles based on schedule data of the farming organization. By doing so, the farming organization can ensure they perform a given type of agricultural operation on a given field at the same starting location each time, regardless of which operator is performing the operation and which vehicle they are using.

The operations center 120 stores data corresponding to fields managed by the farming organization. Some of the data in the operation center may be generated by one or more vehicles used by the farming organization (including but not limited to the vehicle 100), while other data in the operation center may be obtained from different sources. The server circuitry 118 stores the data in the operations center 120, then subsequently uses one or more portions of the data to generate the foregoing start points. The server circuitry 118 and the operations center 120 are described further in connection with FIG. 4.

Figure 2:
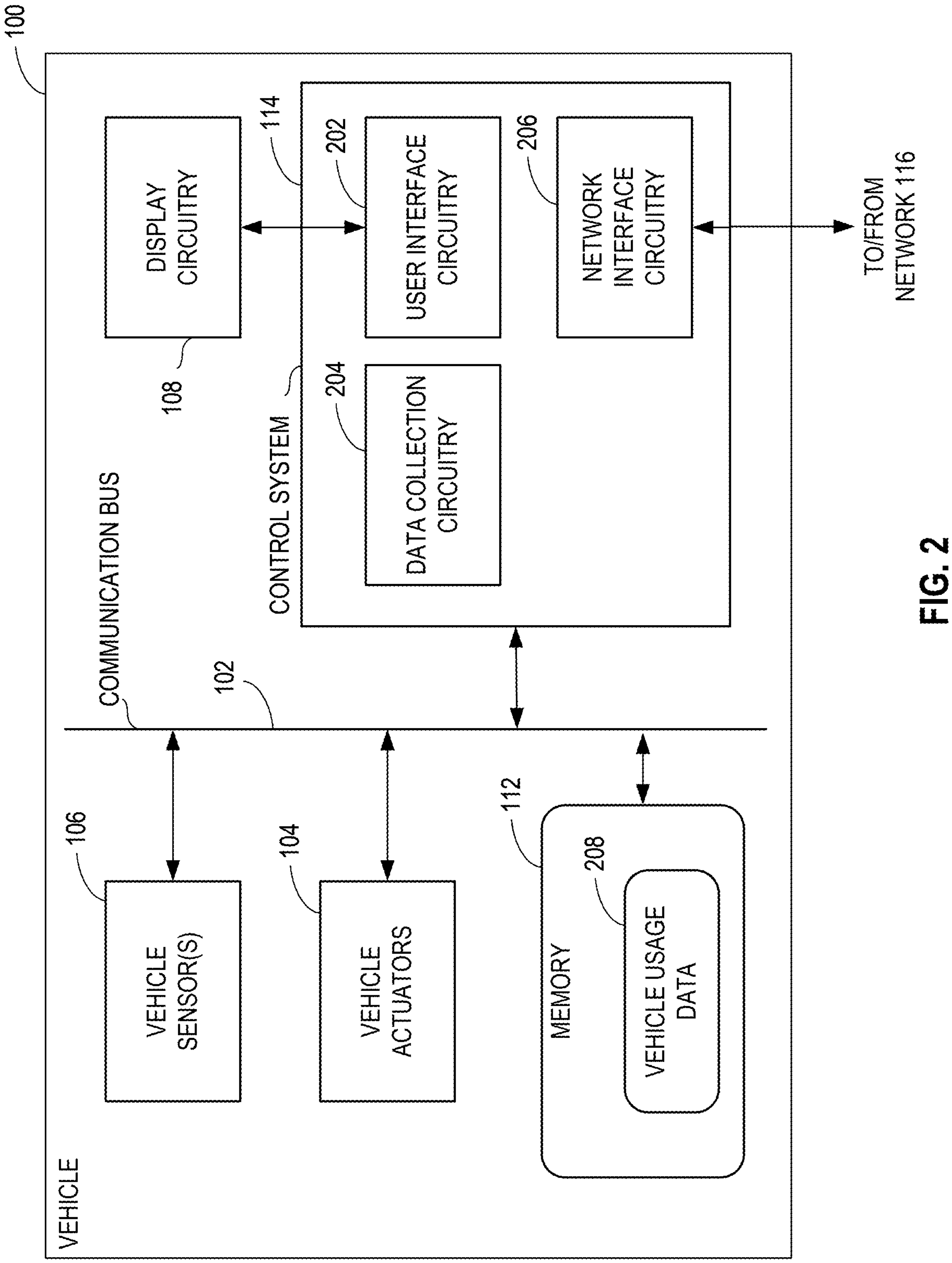
FIG. 2 is a block diagram of an example implementation of the agricultural vehicle of FIG. 1.

FIG. 2 is a block diagram of an example implementation of the vehicle 100 of FIG. 1. The example of FIG. 2 includes the communication bus 102, the actuators 104, the sensors 106, the display circuitry 108, the memory 112, and the control system 114 of FIG. 1. In the example of FIG. 2, the control system 114 includes user interface (UI) circuitry 202, data collection circuitry 204, and network interface circuitry 206. The memory 112 includes vehicle usage data 208.

The control system 114 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the control system 114 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIGS. 2 and 4 may, thus, be instantiated at the same or different times. Some or all of the circuitry of FIGS. 2 and 4 may be instantiated, for example, in one or more threads executing concurrently on hardware and/or in series on hardware. Moreover, in some examples, some or all of the circuitry of FIGS. 2 and 4 may be implemented by microprocessor circuitry executing instructions and/or FPGA circuitry performing operations to implement one or more virtual machines and/or containers.

Within the control system 114, the UI circuitry 202 determines what visuals to present on the screen of the display circuitry 108. To do so, the UI circuitry 202 maintains a UI that organizes the information available for presentation into multiple pages. Information organized by the UI circuitry includes but is not limited to geographical maps, start point coordinates, vehicle path information, etc. In some examples, the pages are referred to as menus. In some examples, the UI circuitry 202 is instantiated by programmable circuitry executing user interface instructions and/or configured to perform operations such as those represented by the flowchart(s) of FIGS. 7-9.

In some examples, the vehicle 100 includes means for controlling a UI. For example, the means for controlling a UI may be implemented by user interface circuitry 202. In some examples, the user interface circuitry 202 may be instantiated by programmable circuitry such as the example programmable circuitry 1012 of FIG. 10. For instance, the user interface circuitry 202 may be instantiated by the example microprocessor 1100 of FIG. 11 executing machine executable instructions such as those implemented by at least blocks 712 of FIG. 7. In some examples, the user interface circuitry 202 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the user interface circuitry 202 may be instantiated by any other combination of hardware, software, and/or firmware. For example, the user interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The data collection circuitry 204 collects data from the actuators 104, sensors 106, and any other inputs that may exist within the vehicle 100 (e.g., cabin controls). The data collection circuitry 204 may store one or more pieces of data in the memory 112 as the vehicle usage data 208, provide one or more pieces of data to the UI circuitry 202 for presentation on the display circuitry 108, and/or provide one or more pieces of data to the network interface circuitry 206 for transmission over the network 116. In some examples, the data collection circuitry 204 is instantiated by programmable circuitry executing data collection instructions and/or configured to perform operations such as those represented by the flowchart(s) of FIGS. 7-9.

In some examples, the vehicle 100 includes means for collecting data. For example, the means for collecting may be implemented by data collection circuitry 204. In some examples, the data collection circuitry 204 may be instantiated by programmable circuitry such as the example programmable circuitry 1012 of FIG. 10. For instance, the data collection circuitry 204 may be instantiated by the example microprocessor 1100 of FIG. 11 executing machine executable instructions such as those implemented by at least blocks 702 of FIG. 7. In some examples, the data collection circuitry 204 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the data collection circuitry 204 may be instantiated by any other combination of hardware, software, and/or firmware. For example, the data collection circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The network interface circuitry 206 enables other components within the control system 114 to send or receive data over the network 116. For example, the network interface circuitry 206 uses the network 116 to transmit one or more parameters from the vehicle usage data 208 to the server circuitry 118 for use in determining a start point. The network interface circuitry 206 may include transceivers, antennas, and/or other hardware components required to send and receive data over the network 116. In some examples, the network interface circuitry 206 is instantiated by programmable circuitry executing network interface instructions and/or configured to perform operations such as those represented by the flowchart(s) of FIGS. 7-9.

In some examples, the vehicle 100 includes means for communicating over a network. For example, the means for communicating may be implemented by network interface circuitry 206. In some examples, the network interface circuitry 206 may be instantiated by programmable circuitry such as the example programmable circuitry 1012 of FIG. 10. For instance, the network interface circuitry 206 may be instantiated by the example microprocessor 1100 of FIG. 11 executing machine executable instructions such as those implemented by at least blocks 702, 712 of FIG. 7. In some examples, the network interface circuitry 206 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the network interface circuitry 206 may be instantiated by any other combination of hardware, software, and/or firmware. For example, the network interface circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

FIG. 3 is an illustrative example of vehicle usage data. In the example of FIG. 3, the vehicle usage data 300 is a table formed of rows 302A, 302B, . . . , 302O (collectively referred to as rows 302). Each example row 302A includes a corresponding date value 304A, time value 306A, operator value 308A, activity value 310A, start point latitude 312A, start point longitude 314A, end point latitude 316A, and end point longitude 318A. In some examples, the rows 302 contain additional and/or different pieces of data besides those shown in FIG. 3.

The vehicle usage data 300 of FIG. 3 is an example implementation of the vehicle usage data 208 of FIG. 2. In the example of FIG. 3, the data collection circuitry 204 forms the vehicle usage data 300 by storing data from one session per row within the memory 112. As used above and herein, a session refers to a period in which the vehicle 100 performs one agricultural operation. The type of agricultural operation performed during a given session is stored in as the activity value 310A within the corresponding row 302A. In the example of FIG. 3, the rows 302 are stored by the activity fields 310 and there are four types of agricultural operations: tilling, planting, fertilizing, and harvesting. In other examples, the activity fields 310 include other types of agricultural operations in addition to and/or in replacement of those shown in FIG. 3.

The date value 304A and time value 306A within a given row 302A collectively describe when the vehicle 100 performed the corresponding session. The data collection circuitry 204 can determine when a session begins using any suitable source. Such sources may include but are not limited to a clock signal within the control system 114, the server circuitry 118, etc. The date values 304 and time values 306 may be stored in the vehicle usage data 300 using any suitable format.

A given row 302A also includes an operator value 308A that describes who was using the vehicle 100 during the corresponding session. In the example of FIG. 3, the operator values 308 collectively show that five different people used the vehicle 100 during the sessions that correspond to the rows 302A-302O: an owner of the vehicle 100, three of the owner's employees, and a lease of the vehicle 100. More generally, any number of people may use the vehicle 100 and be identified within the operator values 308. In other examples, the operator values 308 are formatted differently than shown in FIG. 3. For instance, if users are required to log into the control system 114 before using the vehicle 100, the data collection circuitry 204 may assign one code (e.g., an alphanumeric sequence) to each unique set of authorized log-in credentials received by the control system 114 and store the codes as the operator values 308.

The start latitude value 312A and start longitude value 314A within a given row 302A collectively describe where the agricultural operations for the corresponding session began. Accordingly, the start latitude values 312 and start longitude values 314 are collectively referred to as starting locations and/or start points as described above and herein. In the example of FIG. 3, the start latitude values 312 and start longitude values 314 indicate the sessions corresponding to rows 302A-302O occurred on adjacent zones. In other examples the vehicle 100 performs agricultural operations on one or more geographically disparate zones. The start latitude values 312 and start longitude values 314 may be stored in any suitable format, including but not limited to GPS coordinates.

The end latitude value 316A and end longitude value 318A within a given row 302A collectively describe where the agricultural operations for the corresponding session end. Accordingly, the end latitude values 316 and the end longitude values 318 within may be collectively referred to herein as ending locations and/or end points as described herein. The data collection circuitry 204 may use any suitable technique to determine when agricultural operations have ended. Such techniques include but are not limited to interpreting one or more signals from the actuators 104, interpreting a change in the information presented on the display circuitry 108 to the operator, using sensor data to identify the vehicle 100 has left the zone where the session began, etc. The end latitude values 316 and end longitude values 318 may be stored in any suitable format, including but not limited to GPS coordinates.

FIG. 3 provides examples of the type of data that the server circuitry 118 may obtain from one or more vehicles to use as inputs when generating new start points. In some examples, the data collection circuitry 204 stores additional or alternative fields of information in the vehicle usage data 208 besides those shown in FIG. 3. The data collection circuitry 204 may also determine a total number of rows 302 to store in the memory 112 at a given time, which sessions to record as data stored in the memory 112, which sessions to not record, when to overwrite a given row 302A with data from a new session, etc.

Figure 4:
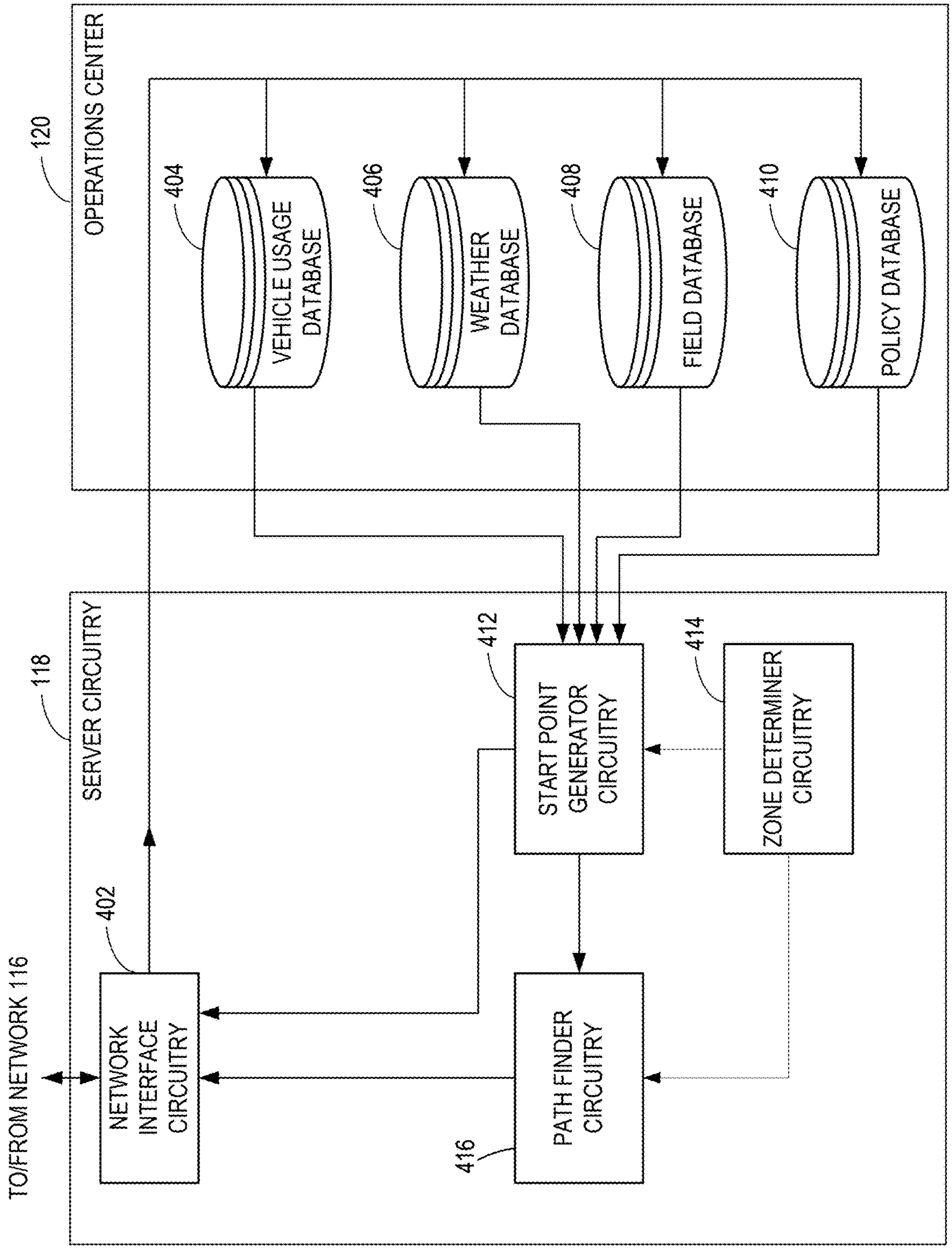
FIG. 4 is a block diagram of an example implementation of the server circuitry of FIG. 1.

FIG. 4 is a block diagram of an example implementation of the server circuitry 118 and the operations center 120 of FIG. 1. FIG. 4 shows the server circuitry 118 includes example network interface circuitry 402, example start point generator circuitry 412, example zone determiner circuitry 414, and example path finder circuitry 416. FIG. 4 also shows the operations center 120 includes an example vehicle usage database 404, an example weather database 406, an example field database 408, an example policy database 410.

The server circuitry 118 of FIGS. 2 and 4 may be instantiated (e.g., creating an instance of, bring into being for any length of time, materialize, implement, etc.) by programmable circuitry such as a Central Processor Unit (CPU) executing first instructions. Additionally or alternatively, the server circuitry 118 of FIGS. 2 and 4 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIGS. 2 and 4 may, thus, be instantiated at the same or different times. Some or all of the circuitry of FIGS. 2 and 4 may be instantiated, for example, in one or more threads executing concurrently on hardware and/or in series on hardware. Moreover, in some examples, some or all of the circuitry of FIGS. 2 and 4 may be implemented by microprocessor circuitry executing instructions and/or FPGA circuitry performing operations to implement one or more virtual machines and/or containers.

The network interface circuitry 402 enables other components within the server circuitry 118 to send or receive data over the network 116. For example, the network interface circuitry 402 uses the network 116 to receive vehicle usage data 208 from one or more vehicles. The network interface circuitry 402 also uses the network 116 to obtain other data from other sources as described below. The network interface circuitry 402 also transmits generated start points, and optionally transmits generated paths, to one or more vehicles via the network 116. The network interface circuitry 402 may include transceivers, antennas, and/or other hardware components required to send and receive data over the network 116. In some examples, the network interface circuitry 402 is instantiated by programmable circuitry executing network interface instructions and/or configured to perform operations such as those represented by the flowchart(s) of FIGS. 7-9.

The server circuitry 118 obtains multiple different types of data from multiple different sources for use in generating start points. In the example of FIG. 4, the start point generator circuitry 412 instructs the network interface circuitry 402 to obtain said data from external sources via the network 116. The server circuitry 118 then stores said data in the operations center 120 using one or more of the vehicle usage database 404, the weather database 406, the field database 408, or the policy database 410. The foregoing databases may be implemented by any memory, storage device and/or storage disc for storing data such as, for example, flash memory, magnetic media, optical media, solid state memory, hard drive(s), thumb drive(s), etc. Furthermore, the data stored in the vehicle usage database 404, the weather database 406, the field database 408, and the policy database 410 may be in any data format such as, for example, binary data, comma delimited data, tab delimited data, structured query language (SQL) structures, etc. While, in the illustrated example, the foregoing databases is illustrated as four separate components within the operations center 120, the foregoing databases and/or any other data storage devices described herein may be implemented by any number and/or type(s) of internal and/or external memories.

Within the operations center 120, the vehicle usage database 404 stores multiple copies of vehicle usage data 208 obtained from one or more agricultural vehicles utilized by the farming organization. The vehicle usage database 404 may include but is not limited to date values 304, time values 306, operator values 308, agricultural activity values 310, starting location values, ending location values, and corresponding timestamps as described above. In some examples, the data stored in the vehicle usage database 404 is referred to as historical vehicle usage data because the start point generator circuitry 412 may use said data to generate a start point after the work sessions occurred.

Within the operations center 120, the weather database 406 stores data that describes the weather when and where the sessions in the vehicle usage database 404 occurred. Data within the weather database 406 may include but is not limited to temperature values, precipitation values, wind values, humidity data, corresponding timestamps, etc. The start point generator circuitry 412 may populate the weather database 406 using any suitable source(s), including but not limited to: the sensors 106 on the vehicles, external sensors not on the vehicles but still managed by the farming organization, meteorological and/or almanac information from verified sources on the Internet, etc. In some examples, the data stored in the weather database 406 is referred to as historical weather data because the start point generator circuitry 412 may use said data to generate a start point after the weather measurements were recorded.

Within the operations center 120, the field database 408 includes data that describes the conditions of the field on which the sessions in the vehicle usage database 404 occurred. Data within the field database 408 includes but is not limited to soil type values (e.g., sand, slit, clay, etc.), soil health indicators (nutrient availability, workability, toxicity, salinity, etc.), crop types values (corn, soybeans, rye, etc.), growth stage values (e.g., Zadok growth scale, Feekes growth scale, or other quantization metrics), corresponding timestamps, etc. In some examples, the data stored in the field database 408 is referred to as historical field data because the start point generator circuitry 412 may use said data to generate a start point after the field measurements were recorded.

In general, the policy database 410 stores any information that does not correspond to the vehicle usage database 404, weather database 406, or field database 408, but could still be useful to the start point generator circuitry 412 when generating a start point. For example, the policy database 410 may include organizational data that describes the how the farming organization assigns tasks (e.g., specific individuals use specific vehicles to perform specific agricultural operations in a specific zone). The policy database 410 may also include but is not limited to schedule data (e.g., corn was planted on a given field last season, so rye is scheduled to be planted on the field next season for crop rotation), zone boundary data, corresponding timestamps, etc. Zone boundary data includes both external boundaries and internal boundaries as described further in connection with FIG. 6. In some examples, the data stored in the policy database 410 is referred to as historical policy data because the start point generator circuitry 412 may use said data to generate a start point after the policy decisions are made.

Within the server circuitry 118, the start point generator circuitry 412 generates start points for land managed by the farming organization. To do so, the start point generator circuitry 412 populates the operations center 120 as described above. In some examples, the start point generator circuitry 412 then groups the starting locations within the vehicle usage database 404 into clusters based on one or more database (DB) factors within the operations center 120, selects one of the clusters, and computes an average of the starting points in the cluster to generate a new start point. In other examples, the start point generator circuitry 412 implements a machine learning model that accepts one or more DB factors from the operations center 120 as inputs and generates a start point as an output. In some examples, the start point generator circuitry 412 is instantiated by programmable circuitry executing start point generator instructions and/or configured to perform operations such as those represented by the flowchart(s) of FIGS. 7-9.

In some examples, the server circuitry 118 includes means for generating a start point. For example, the means for generating a start point may be implemented by start point generator circuitry 412. In some examples, the start point generator circuitry 412 may be instantiated by programmable circuitry such as the example programmable circuitry 1012 of FIG. 10. For instance, the start point generator circuitry 412 may be instantiated by the example microprocessor 1100 of FIG. 11 executing machine executable instructions such as those implemented by at least blocks 704, 802-826 of FIGS. 7 and 8. In some examples, the start point generator circuitry 412 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the start point generator circuitry 412 may be instantiated by any other combination of hardware, software, and/or firmware. For example, the start point generator circuitry 412 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations The start point generator circuitry 412 generates one start point per zone as described above. Accordingly, the zone determiner circuitry 414 organizes the land managed by the farming organization into one or more zones. The zone determiner circuitry 414 then provides the zone definitions to both the start point generator circuitry 412 and the path finder circuitry 416. The zone determiner circuitry 414 may use any suitable technique to produce zone definitions, including but not limited to receiving instructions from an employee of the farming organization as described above. In some examples, the zone determiner additionally or alternatively determines zone definitions based on one or more of the vehicle usage database 404, the weather database 406, and the field database 408. In some examples, the zone determiner circuitry 414 is instantiated by programmable circuitry executing zone determiner instructions and/or configured to perform operations such as those represented by the flowchart(s) of FIGS. 7-9.

In some examples, the server circuitry 118 includes means for organizing land into zones. For example, the means for organizing land into zones may be implemented by zone determiner circuitry 414. In some examples, the zone determiner circuitry 414 may be instantiated by programmable circuitry such as the example programmable circuitry 1012 of FIG. 10. For instance, the zone determiner circuitry 414 may be instantiated by the example microprocessor 1100 of FIG. 11 executing machine executable instructions such as those implemented by at least blocks 702, 706 of FIG. 7. In some examples, the zone determiner circuitry 414 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the zone determiner circuitry 414 may be instantiated by any other combination of hardware, software, and/or firmware. For example, the zone determiner circuitry 414 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the path finder circuitry 416 generates a path for a vehicle to drive through a field. In such examples, the path finder circuitry determines the path by determining a traversal order of the zones within the field that efficiently links the generated start points of a given zone to the end points the of adjacent zone. Paths generated by the path finder circuitry 416 may be specific to any set of parameters, including but not limited to which vehicle is traversing the path and which agricultural operation said vehicle is performing. In some examples, the path finder circuitry 416 is instantiated by programmable circuitry executing path finder instructions and/or configured to perform operations such as those represented by the flowchart(s) of FIGS. 7-9.

In some examples, the server circuitry 118 includes means for finding a path. For example, the means for finding may be implemented by path finder circuitry 416. In some examples, the path finder circuitry 416 may be instantiated by programmable circuitry such as the example programmable circuitry 1012 of FIG. 10. For instance, the path finder circuitry 416 may be instantiated by the example microprocessor 1100 of FIG. 11 executing machine executable instructions such as those implemented by at least blocks 708, 902-908 of FIGS. 7 and 9. In some examples, the path finder circuitry 416 may be instantiated by hardware logic circuitry, which may be implemented by an ASIC, XPU, or the FPGA circuitry 1200 of FIG. 12 configured and/or structured to perform operations corresponding to the machine readable instructions. Additionally or alternatively, the path finder circuitry 416 may be instantiated by any other combination of hardware, software, and/or firmware. For example, the path finder circuitry 416 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Figure 5:
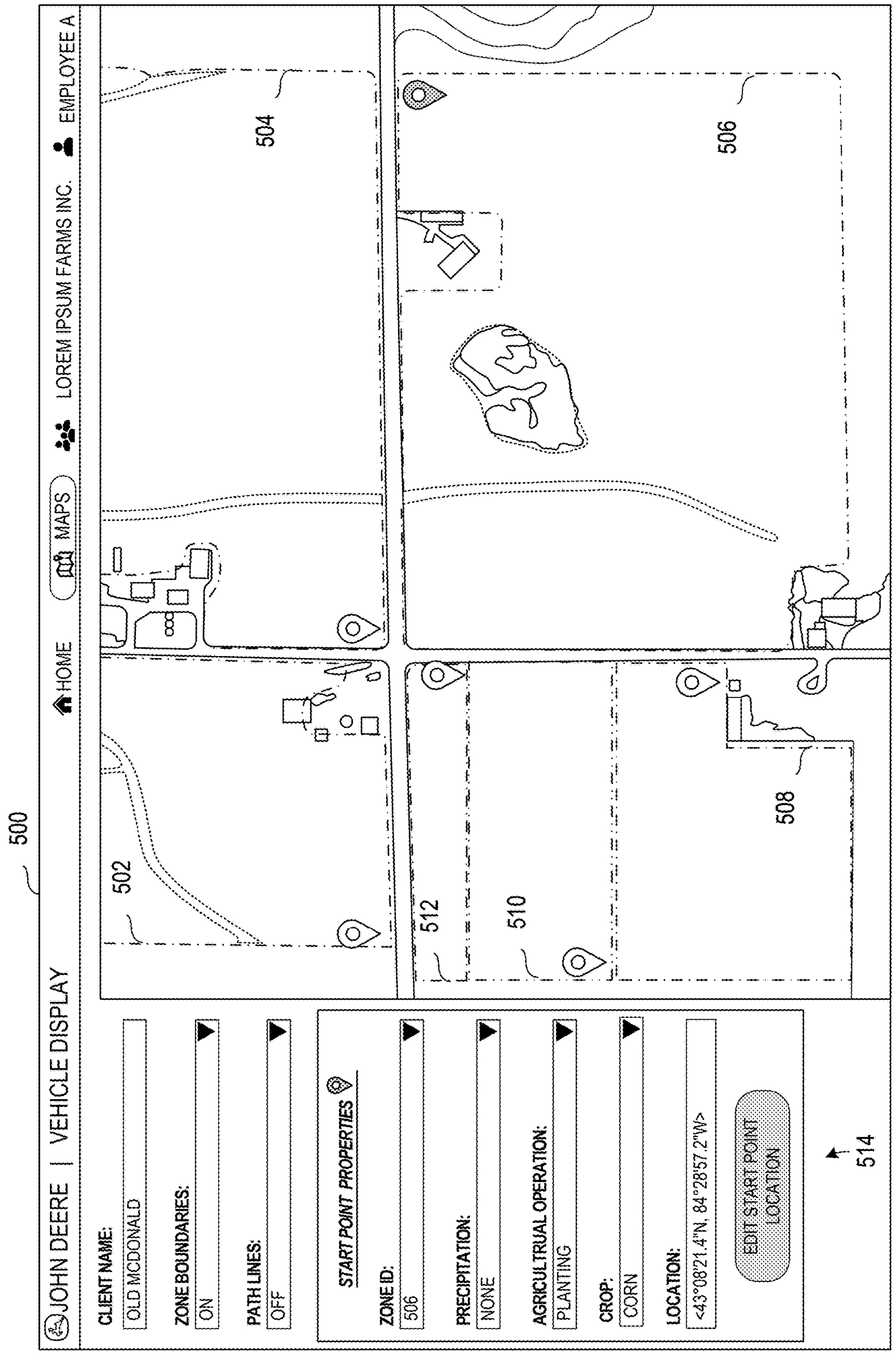
FIG. 5 is an illustrative example of a user interface shown on the display circuitry 108 within the vehicle 100 of FIG. 1.

FIG. 5 is an illustrative example of a UI shown on the display circuitry 108 within the vehicle 100 of FIG. 1. In FIG. 5, the display circuitry 108 shows the example view 500. The view 500 includes example zones 502, 504, 506, 508, 510, and 512, and example view parameters 514.

In the example of FIG. 5, an individual (Employee A) from a farming organization (Lorem Ipsum Farm Inc.) logs into the control system 114 of the vehicle 100. Before using the vehicle 100 to perform work on a client (Old McDonald) 's land, the employee navigates to the view 500 on the display circuitry 108. The view 500 has a map that shows some or all of the client's land. The map is annotated to show the boundaries of the zones 502-512. The map is also annotated to include one start point per zone as described above. In the example of FIG. 5, the start points are shown as pin icons on the view 500.

The control system 114 automatically adds the start points to the map. Accordingly, the pin icons are present on the display circuitry 108 as soon as the employee navigates to the view 500 and are not manually placed by the employee. To automatically add start points to the map, the network interface circuitry 206 first receives data that describes the start points from the server circuitry 118 via the network 116 as described above. Such data may include but is not limited to the information shown in the 'Start Point Properties' pane of the view parameters 514. The UI circuitry 202 then constructs the view 500 (e.g., adds pin icons to the map, populates the start point properties pane, etc.) based on said information.

The view 500 shows that the zones 502-512 have both external boundaries (e.g., the public roads that cross within the middle of the map), and internal boundaries (e.g., homes, ponds, private roads, etc. that exist within the zone). Thus, a start point generated for a zone is only valid if it refers to GPS coordinates that are both within the external boundaries and outside the internal boundaries of the zone. In some examples, the external boundaries of the zones 502, 504, 506 are physically separated from one another (e.g., by the public roads). In other examples, the external boundaries of the zones 508, 510, 512, may be in direct contact/adjacent to one another.

The 'Start Point Properties' pane of the view parameters 514 describe the properties of a currently selected start point. In the example of FIG. 5, the currently selected start point is in the zone 506 and is shaded grey. In the example of FIG. 5, the server circuitry 118 generate start points that are specific to the amount of recent precipitation, the type of agricultural operation being performed, and the type of crop being planted. Thus, if the employee changes any of the foregoing parameters using the drop down menus shown in the view 500, the control system will replace the start point currently shown for the zone 506 with a different start point within the zone 506. The new start point is also generated by the server circuitry 118 and is specific to the particular start point parameters that have been entered by the employee. The different start points within a given zone 506 may be referred to as candidate start points because the employee may use only one of the candidate start points when performing work in the zone 506. In other examples, the server circuitry 118 generates candidate start points for a zone based on different criteria.

The view 500 also includes a button that the employee can press to edit the currently selected start point location. Thus, the start points shown in FIG. 5 can be referred to as defaults in the sense that, if the employee does not press the edit button, those locations will be used as the starting points by the control system 114 and displayed accordingly in other views of the UI. The start points shown in FIG. 5 can also be referred to as user recommendations in the sense that employee has the option to change the initial coordinates generated by the server circuitry 118 using the edit button. The UI circuitry 202 may support editing the start point using any suitable technique, including but not limited to: making the GPS coordinates in the view parameters 514 an editable text field, allowing the employee to click and drag pin icons throughout their given zone, etc.

Figure 6:
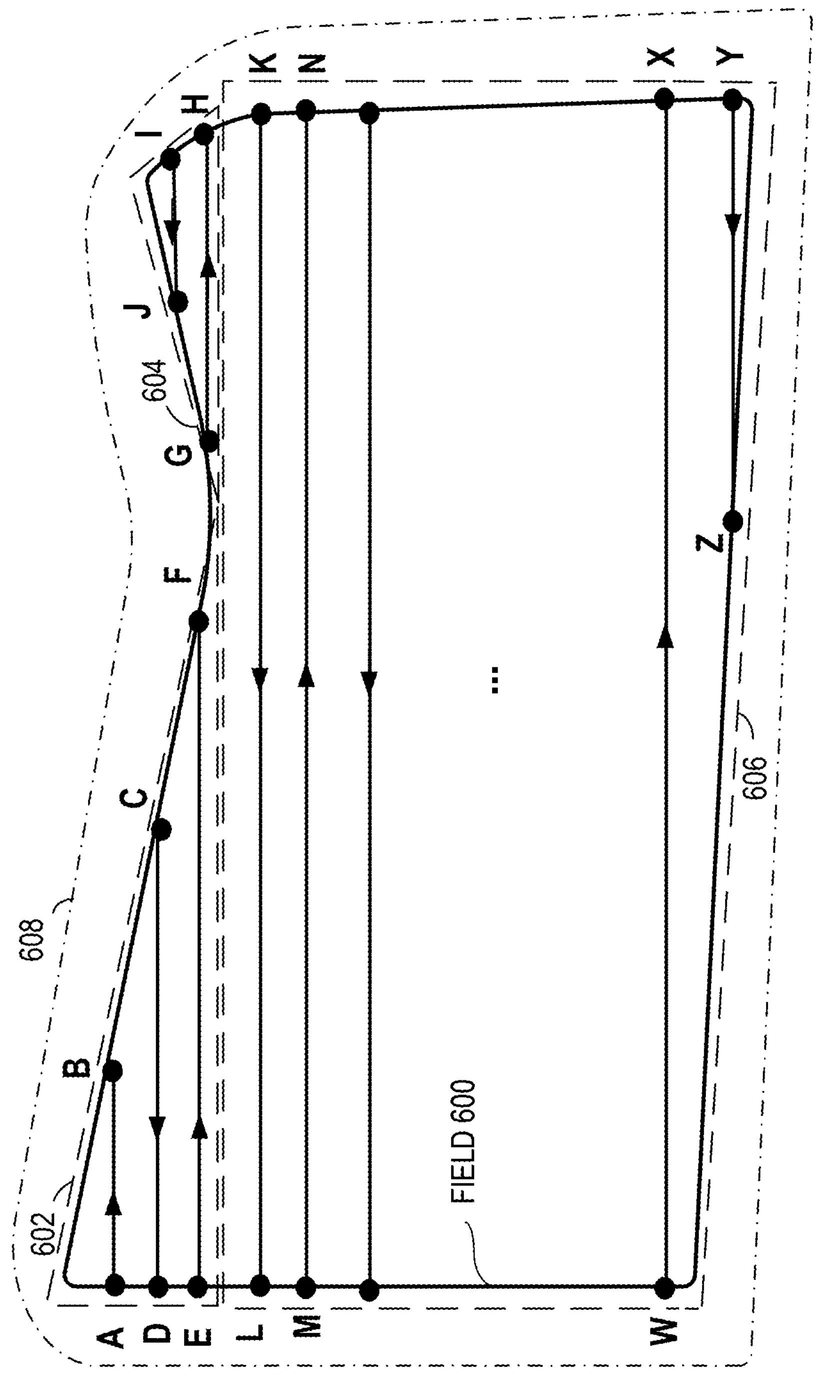
FIG. 6 is an illustrative example of operations performed by the path finder circuitry of FIG. 4.

FIG. 6 is an illustrative example of operations performed by the path finder circuitry 416 of FIG. 4. FIG. 6 includes an example field 600 and example zones 602, 604, 606, 608. The field 600 includes positions A, B, C, . . . , Z.

The path finder circuitry 416 generates a path based on the outputs of both the start point generator circuitry 412 and the zone determiner circuitry 414. In a first example, the zone determiner circuitry 414 divides the field 600 into zones 602, 604, and 606. Accordingly, the start point generator circuitry 412 generates one start point per zone: positions A, I, and L, respectively, in the first example. More generally, the start point generator circuitry 412 may choose any position within the zones as a start point, including but not limited to the Positions A-Z on the perimeter of the field 600.

The path finder circuitry 416 can identify paths within a singular zone and can identify paths that connect multiple zones. In the first example, the server circuitry 118 instructs the path finder circuitry 416 to form a path through multiple zones because zones 602, 604, and 606 share internal boundaries (just as zones 508, 510, and 512 share internal boundaries in the example of FIG. 5). In other examples, the server circuitry 118 instructs the path finder circuitry 416 to form a path through multiple zones that do not share internal boundaries.

When instructed to identify a path that connect multiple zones, the path finder circuitry determines paths through individual zones in a manner that limits the distance the vehicle 100 needs to travel to move between zones. For instance, in the first example, the path finder circuitry 416 selects position A as the start of the multi-zone path and position Z as the end of the multi-zone path. The path finder circuitry 416 then determines the traversal order of the zones: the vehicle 100 enters the zone 602 first, then moves to zone 604, and then to zone 606. Finally, the path finder circuitry 416 individual paths through the zones that, when combined in the foregoing traversal order, collectively form the multi-zone path. In the first example, the multi-zone path traverses through the position markers in alphabetic order as shown in FIG. 8.

In a second example, the zone determiner circuitry 414 determines the entire field 600 corresponds to a singular zone 608. Accordingly, the start point generator circuitry 412 generates only a single start point in the second example. The generated start point may be position A (e.g., the same as the start point of the multi-zone path) or a different location within the field 600 because the start point generator circuitry 412 receives a different input in the second example than the first example. Similarly, the path finder circuitry 416 receives a different input and may therefore generate a different path in the second example than the first example. In either example (e.g., the field 600 is assigned to one zone or multiple zones), the path finder circuitry 416 finds a path that seeks to reduce the amount of land within the field 600 that the vehicle 100 traverses more than once.

While an example manner of implementing the vehicle 100 and the server circuitry 118 of FIG. 1 is illustrated in FIGS. 2 and 4, one or more of the elements, processes, and/or devices illustrated in FIGS. 2 and 4 may be combined, divided, re-arranged, omitted, eliminated, and/or implemented in any other way. Further, the UI circuitry 202, the data collection circuitry 204, the network interface circuitry 206, the network interface circuitry 402, the start point generator circuitry 412, the zone determiner circuitry 414, the path finder circuitry 416, and/or, more generally, the vehicle 100 and the server circuitry 118 of FIGS. 2 and 4, may be implemented by hardware alone or by hardware in combination with software and/or firmware. Thus, for example, any of the UI circuitry 202, the data collection circuitry 204, the network interface circuitry 206, the network interface circuitry 402, the start point generator circuitry 412, the zone determiner circuitry 414, the path finder circuitry 416, and/or, more generally, the vehicle 100 and the server circuitry 118, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example vehicle 100 and/or server circuitry 118 of FIGS. 2 and 4 may include one or more elements, processes, and/or devices in addition to, or instead of, those illustrated in FIGS. 2 and 4, and/or may include more than one of any or all of the illustrated elements, processes and devices.

Figure 7:
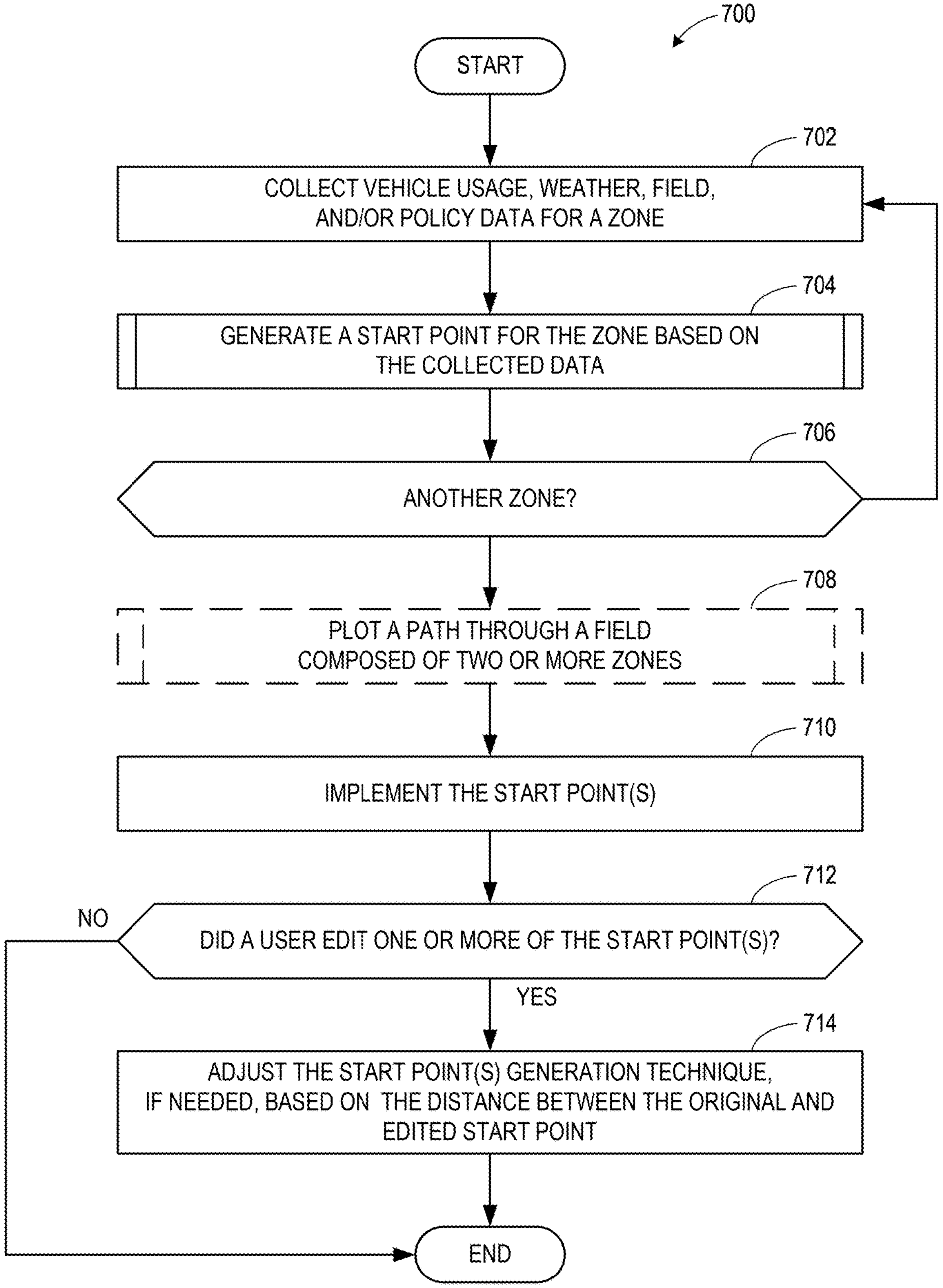
FIG. 7 is a flowchart representative of example machine readable instructions and/or example operations that may be executed, instantiated, and/or performed by example programmable circuitry to implement the server circuitry and/or vehicle of FIGS. 2 and 4.
Figure 8A:
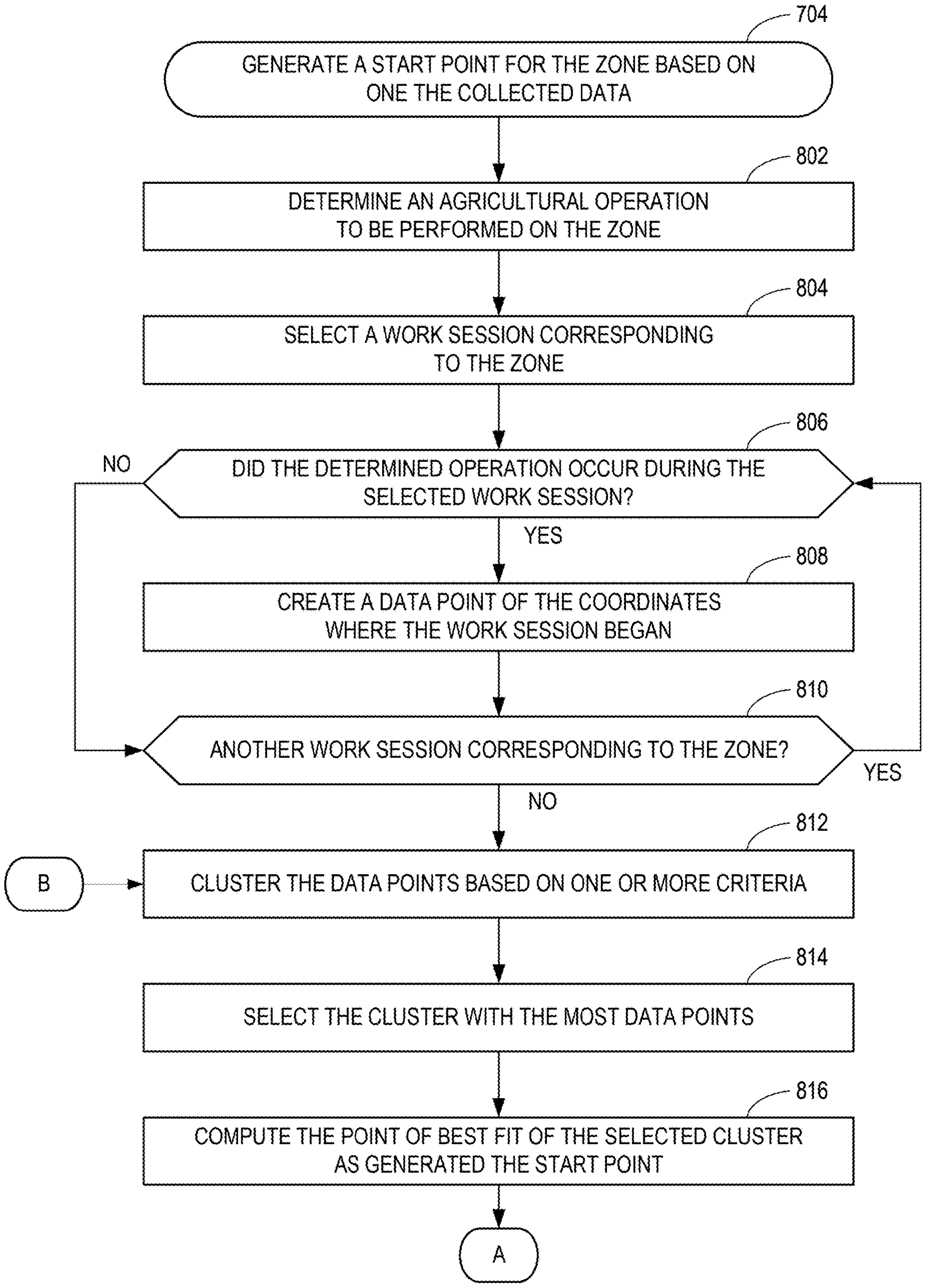
FIGS. 8A and 8B are flowcharts representative of example machine readable instructions and/or example operations that may be executed, instantiated, and/or performed by example programmable circuitry to generate a start point as described in FIG. 7.
Figure 8B:
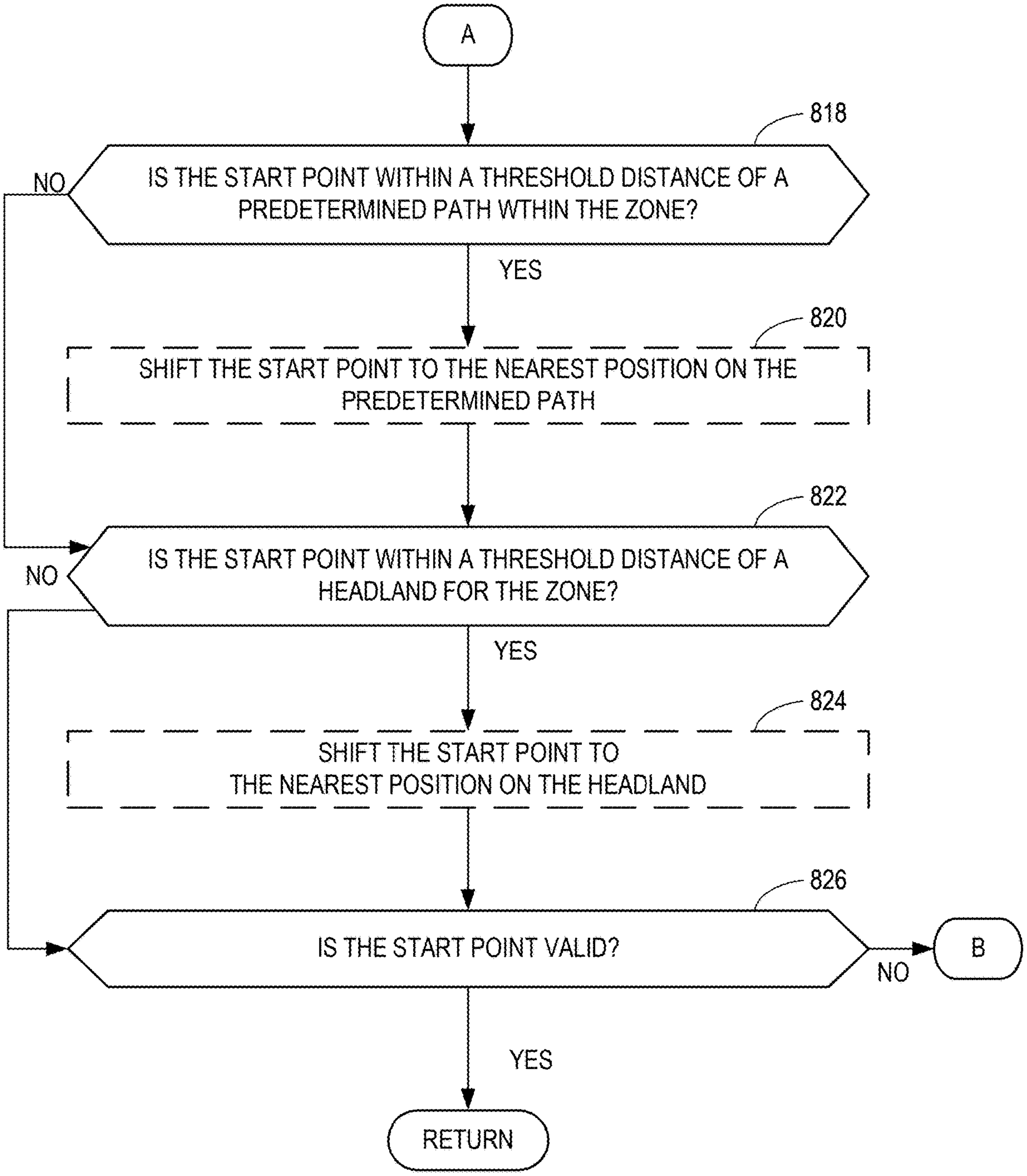
Figure 9:
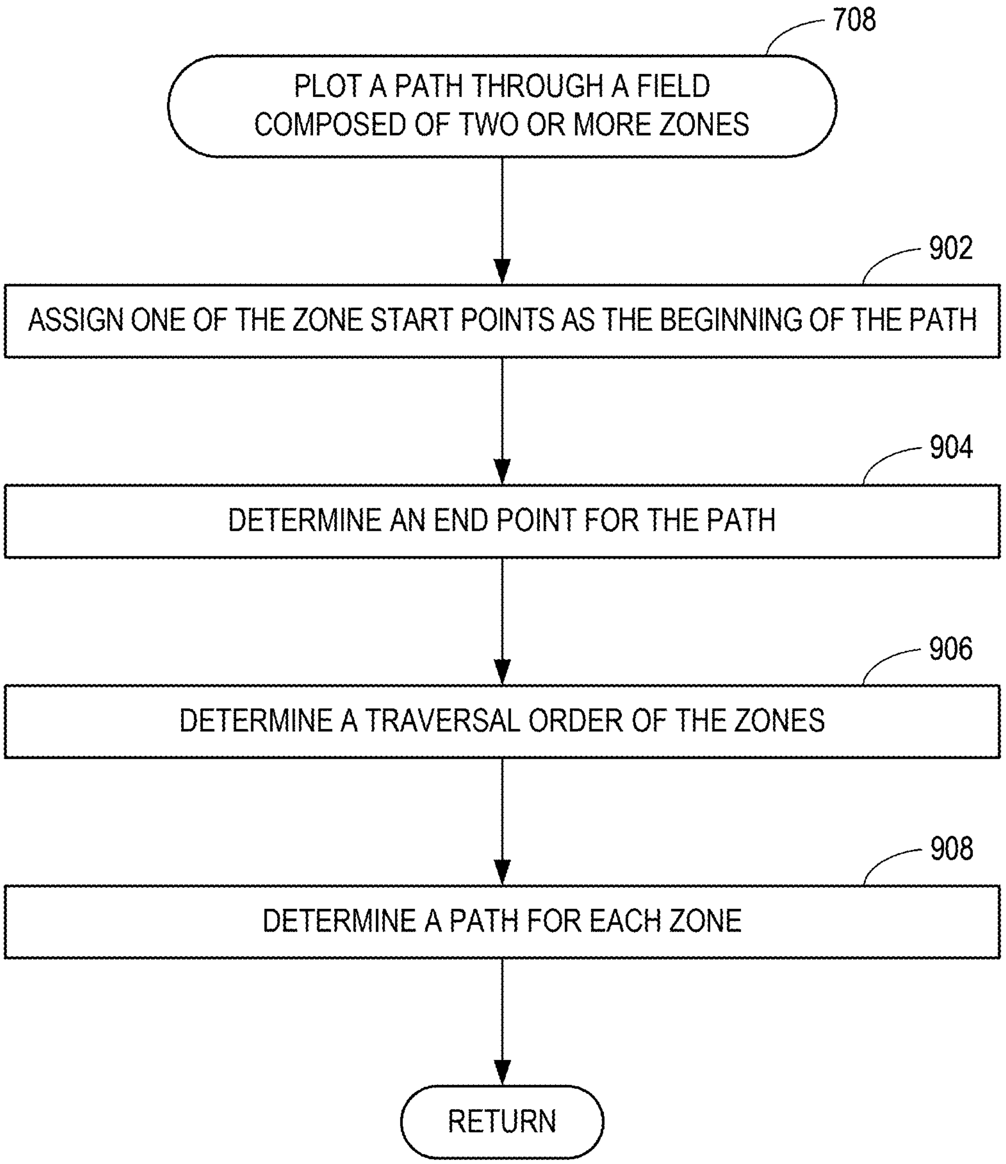
FIG. 9 is a flowchart representative of example machine readable instructions and/or example operations that may be executed, instantiated, and/or performed by example programmable circuitry to plot a path through two or more fields as described in FIG. 7.

Flowchart(s) representative of example machine readable instructions, which may be executed by programmable circuitry to implement and/or instantiate the vehicle 100 and/or the server circuitry 118 of FIGS. 2 and 4 and/or representative of example operations which may be performed by programmable circuitry to implement and/or instantiate the vehicle 100 and/or the server circuitry 118 of FIGS. 2 and 4, are shown in FIGS. 7-9. The machine readable instructions may be one or more executable programs or portion(s) of one or more executable programs for execution by programmable circuitry such as the programmable circuitry 1012 shown in the example programmable circuitry platform 1000 discussed below in connection with FIG. 10 and/or may be one or more function(s) or portion(s) of functions to be performed by the example programmable circuitry (e.g., an FPGA) discussed below in connection with FIGS. 11 and/or 12. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 7-9, many other methods of implementing the example vehicle 100 and/or server circuitry 118 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-9 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 7 is a flowchart representative of example machine readable instructions and/or example operations 700 that may be executed, instantiated, and/or performed by programmable circuitry to implement the server circuitry 118 of FIG. 4. The example machine-readable instructions and/or the example operations 700 of FIG. 7 begin when the start point generator circuitry 412 collects vehicle/actuator usage data, weather data, field data, and/or policy data for a zone. (Block 702). The foregoing data is stored in the operations center 120 within the vehicle usage database 404, the weather database 406, the field database 408, and/or the policy database 410 of FIG. 4, respectively. The start point generator circuitry 412 obtains the data of block 702 from any verified source as described above, including but not limited to one or more agricultural vehicles managed by the farming organization. The start point generator circuitry 412 determines what data to obtain from the foregoing databases based on the zone definition that is provided by the zone determiner circuitry 414.

The start point generator circuitry 412 generates a start point for the zone based on the collected data. (Block 704). To do so, the start point generator circuitry 412 selects specific historical start points in the vehicle usage data based on values from the other collected data. Block 704 is described further in connection with FIGS. 8A and 8B.

The start point generator circuitry 412 determines whether the zone determiner circuitry 414 has provided another zone definition. (Block 706). The zone determiner circuitry 414 may provide additional zone definitions for any reason, including but not limited to instructions from the farming organization.

If the zone determiner circuitry 414 does provide another zone definition (Block 706: Yes), control returns to block 702 where the start point generator circuitry 412 collects additional data for the new zone. If the zone determiner circuitry 414 does provide another zone definition (Block 706: Yes), the path finder circuitry 416 optionally plots a path through a field composed of two or more zones. (Block 708). In such examples, the path finder circuitry 416 plots the path using the two or more start points generated at block 704.

The server circuitry 118 implements the one or more start points of block 704. (Block 710). To do so, the network interface circuitry 402 transmits data corresponding to the start point to the one or more vehicles that are associated with the zone. A vehicle is associated with the field if the vehicle has previously performed one or more of the agricultural activities on the field, the vehicle is scheduled to perform agricultural activities on the field in the future, or the vehicle is predicted to perform agricultural activities on the field in the future. Data corresponding to the generated start point may include but is not limited to the Start Point Properties pane shown in the example of FIG. 5 and discussed above. In some examples, the server circuitry 118 executes the block 710 by a) transmitting a start point to an autonomous agricultural vehicle, b), instructing the vehicle to autonomously travel to the generated start point, and c) instructing the vehicle to begin performance of an agricultural activity upon arrival at the generated start point.

The implemented start point may be considered a default because the start point is automatically used within the control system 114 of the vehicle. The implemented start point(s) of block 710 may additionally or alternatively be considered a recommendation because the user can explicitly edit the location of the start points using the UI as described above. Furthermore, the user can implicitly edit the location of the start points by starting agricultural operations at a location within a zone that is different than the location determined at block 704. Accordingly, the server circuitry 118 determines whether a user has edited one or more of the start points. (Block 712). The server circuitry 118 implements block 712 by instructing the control system 114 to, if the user chooses to implicitly or explicitly edit a start point, send a message via the network 116 that reports and describes said edit.

If the user edits one or more of the start points (Block 712: Yes), the server circuitry 118 adjusts one or more techniques used by the start point generator circuitry 412, if needed, based on the distance between the original generated start point and edited start point. (Block 714). For example, the start point generator circuitry 412 may adjust its clustering algorithm, adjust its track line threshold, adjust its headland threshold, and/or retrain a machine learning model at block 714. In some examples, the server circuitry 118 does not adjust a start point generation technique despite the user editing the start point. The server circuitry 118 may decide not to adjust the start point generation technique at block 704 for any reason, including but not limited to a determination that the user edit is more indicative of a personal preference than a systematic error. The machine-readable instructions and/or operations 700 end after block 714, or if the user did not edit one or more of the start points (Block 712: No).

FIGS. 8A and 8B are flowcharts representative of example machine readable instructions and/or example operations that may be executed, instantiated, and/or performed by example programmable circuitry to generate a start point for a zone as described in FIG. 7. FIGS. 8A and 8B collectively describe an example implementation of how the start point generator circuitry 412 implements block 704 of FIG. 7. In FIG. 8A, execution of block 704 begins when the start point generator circuitry 412 determines an agricultural operation to be performed on the zone. (Block 802). In some examples, the start point generator circuitry 412 may implement block 802 by reviewing the vehicle usage database 404 to determine one or more agricultural operations that have been historically (e.g., previously) performed on the given zone. The start point generator circuitry 412 then implements block 704 multiple times to generate one start point per type of agricultural operation. In other examples, the start point generator circuitry 412 is explicitly informed which agricultural operation to choose at block 802 (e.g., the farming organization is only responsible for fertilizing the zone, so any non-fertilizing operations that may have been performed in the zone by others are irrelevant to the farming organization) and therefore generates only one start point.

The start point generator circuitry 412 selects a work session corresponding to the zone. (Block 804). A work session refers to a period in which the vehicle 100 performs one agricultural operation as described above in connection with FIG. 3. Such data is stored in the vehicle usage database 404 and collected at block 702.

The start point generator circuitry 412 determines whether the agricultural operation of block 802 occurred during the selected work session. (Block 806). If the operation did not occur during the selected work session (Block 806: No), control proceeds to block 810. Alternatively, if the operation did occur during the selected work session (Block 806: Yes), the start point generator circuitry 412 creates a data point of the coordinates where the work session began. (Block 808). The coordinates may be stored in any suitable format, including but not limited to GPS coordinates as described above in FIG. 3.

The start point generator circuitry 412 determines whether there is another work session corresponding to the zone. (Block 810). If the vehicle usage database 404 does contain another work session corresponding to the zone (Block 810: Yes), control returns to block 806 where the start point generator circuitry 412 determines if the operation of block 802 occurs during the selected work session.

Alternatively, if the vehicle usage database 404 does not contain another work session corresponding to the zone (Block 810: No), the start point generator circuitry 412 clusters the data points based on one or more criteria. (Block 812). The criteria of block 812 include one or more factors from the databases of FIG. 4. That is, the start point generator circuitry 412 may group the data points of block 808 into clusters based on which crop was being grown, the temperature of the work session, the growth stage data, the date, a combination of one or more of the foregoing factors, and/or a combination of one or more different factors described above in connection with FIG. 4. In some examples, the operations performed at block 812 to convert database (DB) factors into clusters is a predetermined technique (e.g., a function call or an algorithm).

In other examples, the server circuitry 118 uses machine learning to perform the DB factor to cluster conversion of block 802. In examples other than the flowchart of FIGS. 8A and 8B, the server circuitry 118 implements block 704 using the DB factors as inputs to a ML model but does so without clustering. The server circuitry 118 may use any suitable type of machine learning model to assist or perform in start point generation, including but not limited to neural networks.

The start point generator circuitry 412 selects the cluster with the most data points. (Block 814). The selection is dependent on the criteria used to form the clusters as described above. The start point generator circuitry 412 then computes the point of best fit of the selected cluster as the generated start point. (Block 816). In some examples, the start point generator circuitry 412 computes the point of best fit by averaging the coordinates of the start points (e.g., computing both an average longitude and an average latitude value).

After computing the point of best fit, control proceeds to FIG. 8B where the start point generator circuitry 412 determines whether the generated start point is within a threshold distance of a predetermined path within the zone. (Block 818). In some examples, a farming organization obtains data tracking paths that vehicles that have historically travel through the zone, and/or generates a new path for the zone independently of the generated start point. In such examples, if the start point is within the threshold distance of the predetermined path (Block 818: Yes), the start point generator circuitry 412 optionally shifts the start point to the neatest position on the path. (Block 820). Block 820 is optional because, in some cases, the farming organization may want to use the new start point of block 816 (e.g., to generate a new path) rather than deferring to the predetermined path.

After block 820, or if the start point is not within the threshold distance of a predetermined path (Block 818: No), the start point generator circuitry 412 determines whether the start point is within a threshold distance of a headland for the zone. (Block 822). A headland refers to an area on the perimeter of a zone designated for agricultural vehicles to turn around. If the start point is within a threshold distance of a headland for the zone (Block 822: Yes), the start point generator circuitry 412 optionally shifts the start point to the nearest position on the headland. (Block 824). Block 824 is optional because, in some cases, the farming organization may want to use the new start point of block 816 (e.g., to generate a new path) rather than deferring to the headland.

The start point generator circuitry 412 determines whether the start point is valid. (Block 826). A start point is valid if its location falls within the external boundaries of the zone and outside the internal boundaries of the zone as shown in FIG. 5. If the start point is valid (Block 826: Yes), control returns to block 706 of FIG. 7. Alternatively, if the start point is invalid (Block 826: No), control returns to block 812 of FIG. 8 where the start point generator circuitry 412 clusters the data point differently than the previous iteration. In some examples, the start point generator circuitry 412 shifts the start from an invalid location to the nearest valid location rather than returning control to block 812.

In some examples, the start point generator circuitry 412 regenerates a start point for a zone for other reasons than those described in FIG. 8B. These other reasons may be separate from, and in addition to, the original start point for the zone being invalid as described above. For example, suppose a field has multiple zones and that the vehicle 100 enters the field at a first location to perform an agricultural activity. In this example, before the agricultural activity begins, the server circuitry 118 generated a valid set of start points based on the first location. Suppose further that the vehicle 100 left the field before the agricultural activity is complete (so the user can, e.g., refuel the vehicle 100, take a lunch break, etc.) and then reentered the field at a second location that is different than the first location. In such examples, the server circuitry 118 may re-generate start points for one or more of the zones based in part on the second location and the number of zones where work is already completed. The server circuitry 118 can be triggered to perform such operations using any suitable technique. For example, the regeneration of start points may be triggered based on a manual request from the operator, based on an automated request form the vehicle control system 114, based on the server circuitry 118 analyzing vehicle usage data in real time, etc.

FIG. 9 is a flowchart representative of example machine readable instructions and/or example operations that may be executed, instantiated, and/or performed by example programmable circuitry to plot a path through two or more fields as described in FIG. 7. In particular, the flowchart of FIG. 9 is an example implementation of block 708 of FIG. 7. Execution of block 908 begins when the path finder circuitry 416 assigns one of the zone start points as the beginning of the path. (Block 902). The path finder circuitry 416 may assign a zone as the start of the path for any reason. Such reasons include but are not limited to the direction from which the vehicle 100 arrives at the field, the geometry of the field, etc. In the first example of FIG. 6, the starting zone is zone 602.

The path finder circuitry 416 determines an end point for the path. (Block 904). Like the starting zone, the path finder circuitry 416 may assign an end point for any reason. Such reasons include but are not limited to the direction from which the vehicle 100 arrives at the field, the geometry of the field, etc. In general, the end point of the path is positioned opposite of the start point for the corresponding zone so that the vehicle 100 can traverse the zone while travelling from the start point of the zone to the end point of the path. In the first example of FIG. 6, the end point is position Z.

The path finder circuitry 416 determines a traversal order of the zone. (Block 906). The path finder circuitry 416 selects a traversal order that: a) starts with the zone identified at block 902, b) ends with the zone containing the end point of block 904, and c) minimizes the amount of times the vehicle 100 needs to enter a zone multiple times and/or exit and reenter the field.

The path finder circuitry 416 determines a path for each of the two or more zones. (Block 908). Like the traversal order, the path finder circuitry 416 determines the paths for individual zones in a manner that minimizes the amount that the vehicle 100 needs to enter a zone multiple times and/or exit and reenter the field. Thus, the path through an nth zone in the traversal order generally has an end point that is adjacent to the start point of the (n+1)th zone in the traversal order. Control returns to block 710 after block 908.

Figure 10:
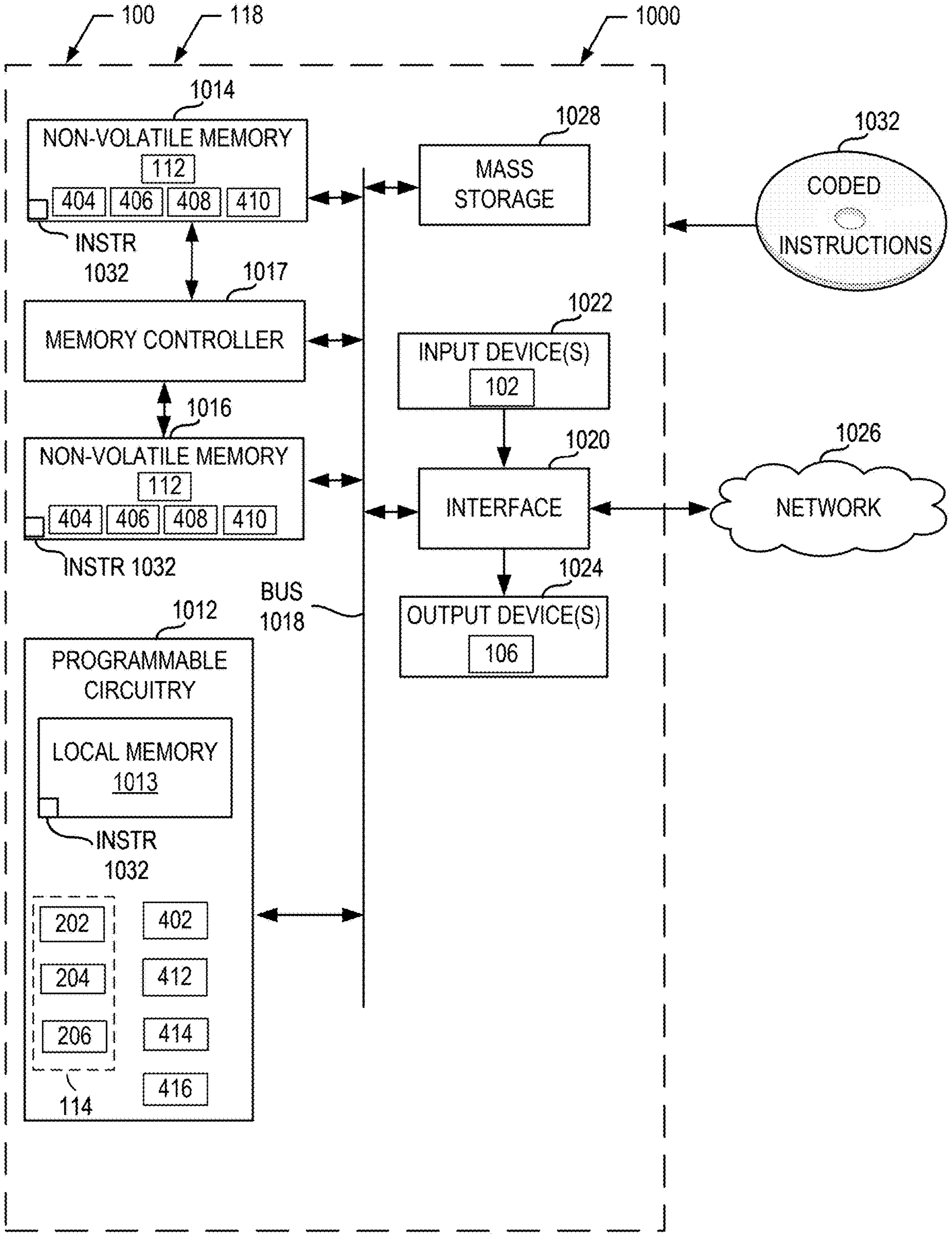
FIG. 10 is a block diagram of an example processing platform including programmable circuitry structured to execute, instantiate, and/or perform the example machine readable instructions and/or perform the example operations of FIGS. 7-9 to implement the vehicle 100 and/or the server circuitry 118 of FIGS. 2 and 4.

FIG. 10 is a block diagram of an example programmable circuitry platform 1000 structured to execute and/or instantiate the example machine-readable instructions and/or the example operations of FIGS. 7-9 to implement the vehicle 100 and/or the server circuitry 118 of FIGS. 2 and 4. The programmable circuitry platform 1000 can be, for example, a server, a personal computer, a workstation, a self-learning machine (e.g., a neural network), an Internet appliance, an electronic control unit (ECU), or any other type of computing and/or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, and/or microcontrollers from any desired family or manufacturer. The programmable circuitry 1012 may be implemented by one or more semiconductor based (e.g., silicon based) devices. In this example, the programmable circuitry 1012 implements one or more of the control system 114 (including the data collection circuitry 204, the UI circuitry 202, and the network interface circuitry 206), the network interface circuitry 402, the start point generator circuitry 412, the zone determiner circuitry 414, and the path finder circuitry 416.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user (e.g., a human user, a machine user, etc.) to enter data and/or commands into the programmable circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system. In examples where the programmable circuitry platform 1000 implements the vehicle 100, the input devices 1022 include the sensors 106.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU. In examples where the programmable circuitry platform 1000 implements the vehicle 100, the output devices 1024 include the actuators 104.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1000 of the illustrated example also includes one or more mass storage discs or devices 1028 to store firmware, software, and/or data. Examples of such mass storage discs or devices 1028 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1032, which may be implemented by the machine readable instructions of FIGS. 7-9, may be stored in the mass storage device 1028, in the volatile memory 1014, in the non-volatile memory 1016, and/or on at least one non-transitory computer readable storage medium such as a CD or DVD which may be removable.

Figure 11:
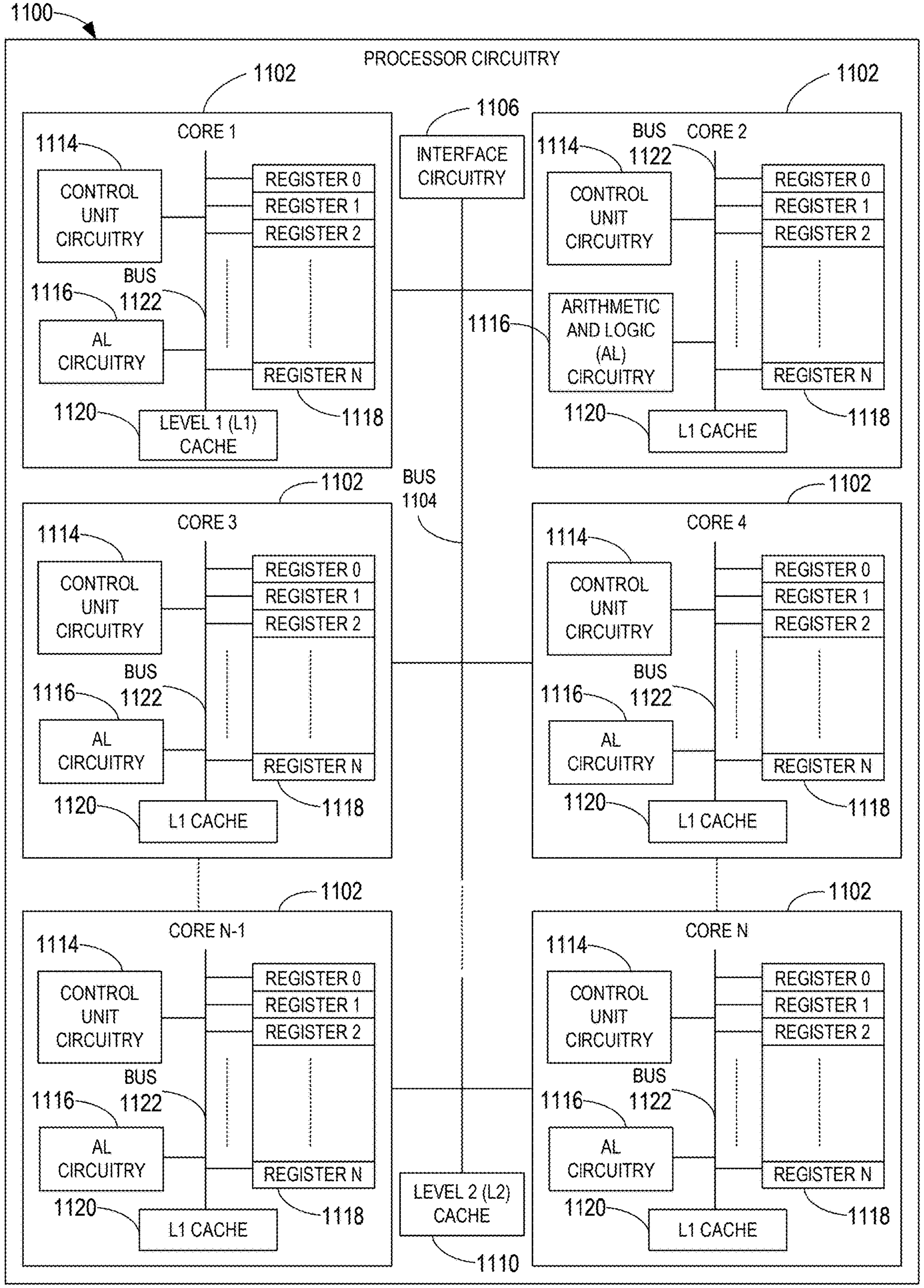
FIG. 11 is a block diagram of an example implementation of the programmable circuitry of FIG. 10.

FIG. 11 is a block diagram of an example implementation of the programmable circuitry 1012 of FIG. 10. In this example, the programmable circuitry 1012 of FIG. 10 is implemented by a microprocessor 1100. For example, the microprocessor 1100 may be a general-purpose microprocessor (e.g., general-purpose microprocessor circuitry). The microprocessor 1100 executes some or all of the machine-readable instructions of the flowcharts of FIGS. 7-9 to effectively instantiate the circuitry of FIGS. 2 and 4 as logic circuits to perform operations corresponding to those machine readable instructions. In some such examples, the circuitry of FIGS. 2 and 4 is instantiated by the hardware circuits of the microprocessor 1100 in combination with the machine-readable instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 7-9.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating-point operations. In yet other examples, the AL circuitry 1116 may include first AL circuitry that performs integer-based operations and second AL circuitry that performs floating-point operations. In some examples, the AL circuitry 1116 may be referred to as an Arithmetic Logic Unit (ALU).

The registers 1118 are semiconductor-based structures to store data and/or instructions such as results of one or more of the operations performed by the AL circuitry 1116 of the corresponding core 1102. For example, the registers 1118 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure, such as by being distributed throughout the core 1102 to shorten access time. The second bus 1122 may be implemented by at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages.

The microprocessor 1100 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1100, in the same chip package as the microprocessor 1100 and/or in one or more separate packages from the microprocessor 1100.

Figure 12:
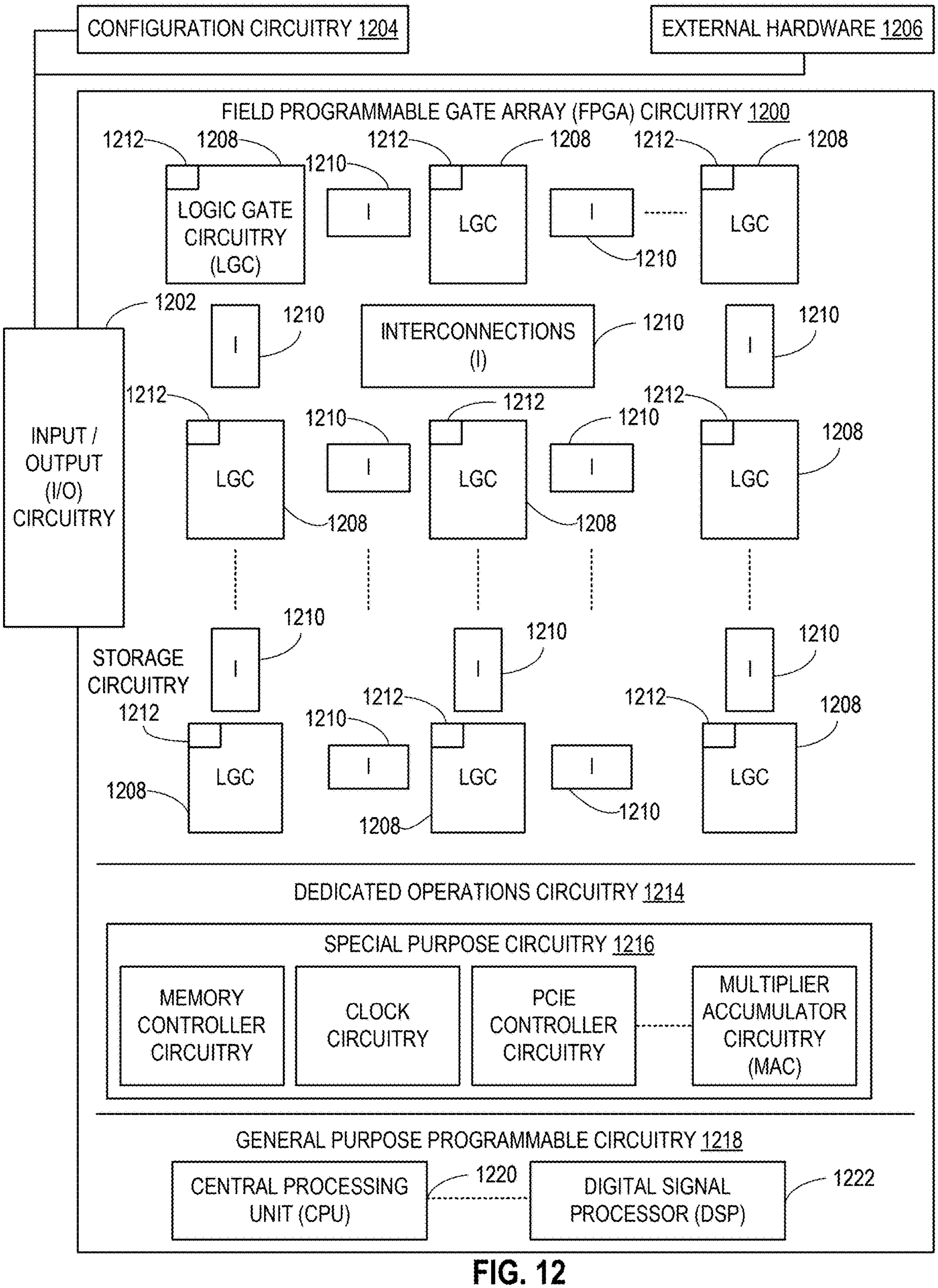
FIG. 12 is a block diagram of another example implementation of the programmable circuitry of FIG. 10.

FIG. 12 is a block diagram of another example implementation of the programmable circuitry 1012 of FIG. 10. In this example, the programmable circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1100 of FIG. 11 described above (which is a general purpose device that may be programmed to execute some or all of the machine readable instructions represented by the flowchart(s) of FIGS. 7-9 but whose interconnections and logic circuitry are fixed once fabricated), the FPGA circuitry 1200 of the example of FIG. 12 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 7-9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 7-9. As such, the FPGA circuitry 1200 may be configured and/or structured to effectively instantiate some or all of the operations/functions corresponding to the machine readable instructions of the flowchart(s) of FIGS. 7-9 as dedicated logic circuits to perform the operations/functions corresponding to those software instructions in a dedicated manner analogous to an ASIC. Therefore, the FPGA circuitry 1200 may perform the operations/functions corresponding to the some or all of the machine readable instructions of FIGS. 7-9 faster than the general-purpose microprocessor can execute the same.

In the example of FIG. 12, the FPGA circuitry 1200 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

The FPGA circuitry 1200 of FIG. 12, includes example input/output (I/O) circuitry 122 to obtain and/or output data to/from example configuration circuitry 1204 and/or external hardware 1206. For example, the configuration circuitry 1204 may be implemented by interface circuitry that may obtain a binary file, which may be implemented by a bit stream, data, and/or machine-readable instructions, to configure the FPGA circuitry 1200, or portion(s) thereof. In some such examples, the configuration circuitry 1204 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1206 may be implemented by external hardware circuitry. For example, the external hardware 1206 may be implemented by the microprocessor 1100 of FIG. 11.

The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations/functions that may correspond to at least some of the machine readable instructions of FIGS. 7-9 and/or other desired operations. The logic gate circuitry 1208 shown in FIG. 12 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations/functions. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example dedicated operations circuitry 1214. In this example, the dedicated operations circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the programmable circuitry 1012 of FIG. 10, many other approaches are contemplated. For example, FPGA circuitry may include an on-board CPU, such as one or more of the example CPU 1220 of FIG. 11. Therefore, the programmable circuitry 1012 of FIG. 10 may additionally be implemented by combining at least the example microprocessor 1100 of FIG. 11 and the example FPGA circuitry 1200 of FIG. 12. In some such hybrid examples, one or more cores 1102 of FIG. 11 may execute a first portion of the machine readable instructions represented by the flowchart(s) of FIGS. 7-9 to perform first operation(s)/function(s), the FPGA circuitry 1200 of FIG. 12 may be configured and/or structured to perform second operation(s)/function(s) corresponding to a second portion of the machine readable instructions represented by the flowcharts of FIGS. 7-9, and/or an ASIC may be configured and/or structured to perform third operation(s)/function(s) corresponding to a third portion of the machine readable instructions represented by the flowcharts of FIGS. 7-9.

It should be understood that some or all of the circuitry of FIGS. 2 and 4 may, thus, be instantiated at the same or different times. For example, same and/or different portion(s) of the microprocessor 1100 of FIG. 11 may be programmed to execute portion(s) of machine-readable instructions at the same and/or different times. In some examples, same and/or different portion(s) of the FPGA circuitry 1200 of FIG. 12 may be configured and/or structured to perform operations/functions corresponding to portion(s) of machine-readable instructions at the same and/or different times.

In some examples, some or all of the circuitry of FIGS. 2 and 4 may be instantiated, for example, in one or more threads executing concurrently and/or in series. For example, the microprocessor 1100 of FIG. 11 may execute machine readable instructions in one or more threads executing concurrently and/or in series. In some examples, the FPGA circuitry 1200 of FIG. 12 may be configured and/or structured to carry out operations/functions concurrently and/or in series. Moreover, in some examples, some or all of the circuitry of FIGS. 2 and 4 may be implemented within one or more virtual machines and/or containers executing on the microprocessor 1100 of FIG. 11.

In some examples, the programmable circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the programmable circuitry 1012 of FIG. 10, which may be in one or more packages. For example, the XPU may include a CPU (e.g., the microprocessor 1100 of FIG. 11, the CPU 1220 of FIG. 12, etc.) in one package, a DSP (e.g., the DSP 1222 of FIG. 12) in another package, a GPU in yet another package, and an FPGA (e.g., the FPGA circuitry 1200 of FIG. 12) in still yet another package.

Figure 13:
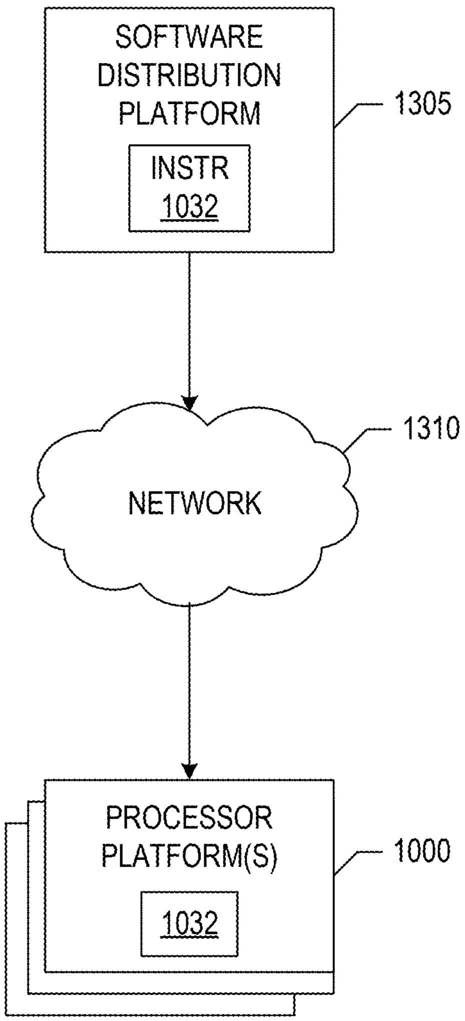
FIG. 13 is a block diagram of an example software/firmware/instructions distribution platform (e.g., one or more servers) to distribute software, instructions, and/or firmware (e.g., corresponding to the example machine readable instructions of FIGS. 7-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to other hardware devices (e.g., hardware devices owned and/or operated by third parties from the owner and/or operator of the software distribution platform) is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions of FIGS. 7-9, as described above. The one or more servers of the example software distribution platform 1305 are in communication with an example network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions of FIGS. 7-9, may be downloaded to the example programmable circuitry platform 1000, which is to execute the machine readable instructions 1032 to implement the vehicle 100 and/or server circuitry 118. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that automatically generate a start point for agricultural operations. Disclosed systems, apparatus, articles of manufacture, and methods improve the efficiency of using a computing device by collecting vehicle usage data, weather data, field data, and policy data related to a zone, grouping previous start points from the zone into clusters based on one or more of the collected parameters, averaging the coordinates of the cluster with the most data pints to generate a new parameter, and optionally shifting the start point to match a path or a headland that is less than a threshold distance away. Example sever circuitry may generate a unique start point for each type of operation performed in a given zone, and may additionally or alternatively distribute a given start point to more than one agricultural vehicle. Accordingly, examples disclosed herein enable the standardization, coordination, and effective distribution of start point information in a manner that was previously unavailable. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to generate a start point, the apparatus comprising:
- interface circuitry;
- machine readable instructions; and
- programmable circuitry to at least one of instantiate or execute the machine readable instructions to:
  - collect historical vehicle usage data that includes descriptions of agricultural activities performed on a field, start points of the agricultural activities, and timestamps associated with the agricultural activities;
  - cluster two or more of the start points together, wherein the two or more start points are selected based on one or more of the historical vehicle usage data, historical weather data, historical field data, or historical policy data;
  - generate a new start point based on the cluster, the generated start point being located within the field; and
  - transmit the generated start point to a vehicle that is associated with the field.

2. The apparatus of claim 1, wherein the historical weather data includes: a) one or more of temperature, precipitation, wind, or humidity data, and b) corresponding timestamps.

3. The apparatus of claim 1, wherein the historical field data includes: a) one or more of soil health indicators, crop type, or growth stage data, and b) corresponding timestamps.

4. The apparatus of claim 1, wherein the historical policy data includes: a) one or more of organizational data, user preference data, external boundaries, or internal boundaries, and b) corresponding timestamps.

5. The apparatus of claim 1, wherein the programmable circuitry is to generate the new start point by averaging coordinates of the two or more start points within the cluster.

6. The apparatus of claim 1, wherein:
- the cluster is a first cluster; and
- the programmable circuitry is to:
  - form a second cluster that includes two or more start points that are different than the first cluster, wherein the two or more start points in the second cluster are also selected based on the one or more of the historical vehicle usage data, historical weather data, historical field data, or historical policy data used to form the first cluster;
  - select the first cluster based on a determination that the first cluster has more data points than the second cluster; and
  - generate the new start point based on the first cluster.

7. The apparatus of claim 1, wherein in response to receiving the generated start point, the vehicle is to:
- autonomously travel to the generated start point; and
- begin performance of an agricultural activity upon arrival at the generated start point.

8. The apparatus of claim 1, wherein a user edits the generated start point before the vehicle begins to perform an agricultural activity on the field.

9. The apparatus of claim 8, wherein the programmable circuitry is to adjust one or more techniques used to generate the start point based on a distance between the original generated start point and the edited start point.

10. The apparatus of claim 9, wherein the programmable circuitry is to:
- train a machine learning model;
- generate the new start point by executing the machine learning model; and
- retrain the machine learning model based on a distance between the original generated start point and the edited start point.

11. The apparatus of claim 1, wherein before the transmission of the generated start point to the vehicle, the programmable circuitry is to check whether the start point is valid by determining whether a) the generated start point is within external boundaries of the field and b) the generated start point is outside internal boundaries of the field.

12. The apparatus of claim 1, wherein the vehicle is associated with the field if:
- the vehicle has previously performed one or more of the agricultural activities on the field;
- the vehicle is scheduled to perform agricultural activities on the field in the future; or
- the vehicle is predicted to perform agricultural activities on the field in the future.

13. A non-transitory machine readable storage medium comprising instructions to cause programmable circuitry to at least:
- collect historical vehicle usage data that includes descriptions of agricultural activities performed on a field, start points of the agricultural activities, and timestamps associated with the agricultural activities;
- cluster two or more of the start points together, wherein the two or more start points are selected based on one or more of the historical vehicle usage data, historical weather data, historical field data, or historical policy data;
- generate a new start point based on the cluster, the generated start point being located within the field; and
- transmit the generated start point to a vehicle that is associated with the field.

14. The non-transitory machine readable storage medium of claim 13, wherein the programmable circuitry is to generate the new start point by averaging coordinates of the two or more start points within the cluster.

15. The non-transitory machine readable storage medium of claim 13, wherein the programmable circuitry is to regenerate the start point in response to a determination that the vehicle has:
- entered the field at a first location to perform an agricultural activity;
- left the field before completing the agricultural activity; and reentered the field to complete the agricultural activity at a second location that is different than the first location, wherein the programmable circuitry determines the regenerated start point based in part on the second location.

16. The non-transitory machine readable storage medium of claim 13, wherein:

the cluster is a first cluster; and the programmable circuitry is to:

form a second cluster that includes two or more start points that are different than the first cluster, wherein the two or more start points in the second cluster are also selected based on the one or more of the historical vehicle usage data, historical weather data, historical field data, or historical policy data used to form the first cluster;

select the first cluster based on a determination that the first cluster has more data points than the second cluster; and generate the new start point based on the first cluster.

17. The non-transitory machine readable storage medium of claim 13, wherein a user explicitly edits the generated start point using a user interface before the vehicle begins to perform an agricultural activity on the field.

18. The non-transitory machine readable storage medium of claim 13, wherein a user implicitly edits the generated start point by starting an agricultural activity with the vehicle at a location that is different than the generated start point.

19. A method comprising:

collecting historical vehicle usage data that includes descriptions of agricultural activities performed on a field, start points of the agricultural activities, and timestamps associated with the agricultural activities;

clustering two or more of the start points together, wherein the two or more start points are selected based on one or more of the historical vehicle usage data, historical weather data, historical field data, or historical policy data;

generating a new start point based on the cluster, the generated start point being located within the field; and transmitting the generated start point to a vehicle that is associated with the field.

20. The method of claim 19, wherein generating the new start point further includes averaging coordinates of the two or more start points within the cluster.

* * * * *